United States Patent
Sone et al.

(10) Patent No.: US 9,185,474 B2
(45) Date of Patent: Nov. 10, 2015

(54) WAVELENGTH PATH SWITCHING METHOD, OPTICAL COMMUNICATION SYSTEM, OPTICAL COMMUNICATION DEVICE, OPTICAL REPEATER, AND NETWORK MANAGEMENT DEVICE

(71) Applicant: FUJITSU LIMITED, Kawasaki-shi, Kanagawa (JP)

(72) Inventors: Kyosuke Sone, Kawasaki (JP); Yasuhiko Aoki, Yokohama (JP); Takeshi Hoshida, Kawasaki (JP); Toshiki Tanaka, Setagaya (JP); Shoichiro Oda, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/261,716

(22) Filed: Apr. 25, 2014

(65) Prior Publication Data

US 2014/0241719 A1 Aug. 28, 2014

Related U.S. Application Data

(63) Continuation of application No. PCT/JP2011/076996, filed on Nov. 24, 2011.

(51) Int. Cl.
  *H04J 14/02* (2006.01)
  *H04Q 11/00* (2006.01)
  *H04B 10/2513* (2013.01)

(52) U.S. Cl.
  CPC ..... *H04Q 11/0005* (2013.01); *H04B 10/25133* (2013.01); *H04J 14/0202* (2013.01);
  (Continued)

(58) Field of Classification Search
  CPC . H04J 14/0212; H04J 14/0201; H04J 14/021; H04J 14/0271; H04J 14/0275; H04J 14/0287;
  H04B 10/25253; H04B 10/6161; H04B 2210/256; G01M 11/338; H04Q 11/0005; G02B 6/29394; G02B 6/356
  USPC ............ 398/81, 48, 29, 83, 45, 147, 148, 159
  See application file for complete search history.

(56) References Cited

U.S. PATENT DOCUMENTS 5,943,151 A * 8/1999 Grasso et al. ................. 398/147
7,447,401 B2 * 11/2008 Frisken ........................... 385/27
(Continued)

FOREIGN PATENT DOCUMENTS

JP 2009-147416 7/2009
JP 2010-147545 7/2010

OTHER PUBLICATIONS

International Search Report, mailed in connection with PCT/JP2011/076996 and mailed Feb. 7, 2012.

*Primary Examiner* — Hibret Woldekidan
(74) *Attorney, Agent, or Firm* — Fujitsu Patent Center

(57) ABSTRACT

At least one of a first device, a second device, and a relay device compensates for wavelength dispersion in a first optical wavelength path. The first or second device changes a wavelength dispersion compensation amount at the first or second device so that wavelength dispersion in a second optical wavelength path is compensated. The relay device changes a wavelength dispersion compensation amount at the relay device so that a total amount of wavelength dispersion of the signal light compensated in the first optical wavelength path does not change substantially with the change in the wavelength dispersion compensation amount at the first or second device. The first optical wavelength path is switched to the second optical wavelength path after the wavelength dispersion compensation amount at the first or second device is changed to a value that can compensate for the wavelength dispersion in the second optical wavelength path.

17 Claims, 16 Drawing Sheets

(52) U.S. Cl.
CPC ......... *H04J14/0204* (2013.01); *H04J 14/0212* (2013.01); *H04J 14/0271* (2013.01); *H04J 14/0275* (2013.01); *H04J 14/0287* (2013.01); *H04B 2210/256* (2013.01); *H04Q 2011/0037* (2013.01)

(56) References Cited

U.S. PATENT DOCUMENTS

| | | | |
|---|---|---|---|
| 7,593,646 B2* | 9/2009 | Vassilieva et al. | 398/182 |
| 7,865,082 B2* | 1/2011 | Honda et al. | 398/81 |
| 8,290,374 B2* | 10/2012 | Li et al. | 398/147 |
| 8,818,189 B2* | 8/2014 | Izumi | 398/29 |
| 8,861,965 B2* | 10/2014 | Nakamura et al. | 398/79 |
| 8,909,060 B2* | 12/2014 | Fukuchi | 398/147 |
| 2001/0021052 A1* | 9/2001 | Michishita | 359/161 |
| 2002/0101633 A1* | 8/2002 | Onaka et al. | 359/119 |
| 2004/0161241 A1* | 8/2004 | Tomofuji et al. | 398/147 |
| 2004/0179850 A1* | 9/2004 | Katagiri et al. | 398/147 |
| 2006/0098987 A1* | 5/2006 | Hoshida | 398/147 |
| 2008/0056726 A1* | 3/2008 | Sugiya et al. | 398/147 |
| 2011/0026927 A1* | 2/2011 | Tanaka et al. | 398/81 |
| 2011/0236023 A1* | 9/2011 | Shukunami et al. | 398/81 |
| 2012/0248287 A1* | 10/2012 | Shukunami | 250/205 |
| 2014/0099130 A1* | 4/2014 | Noheji | 398/208 |

* cited by examiner

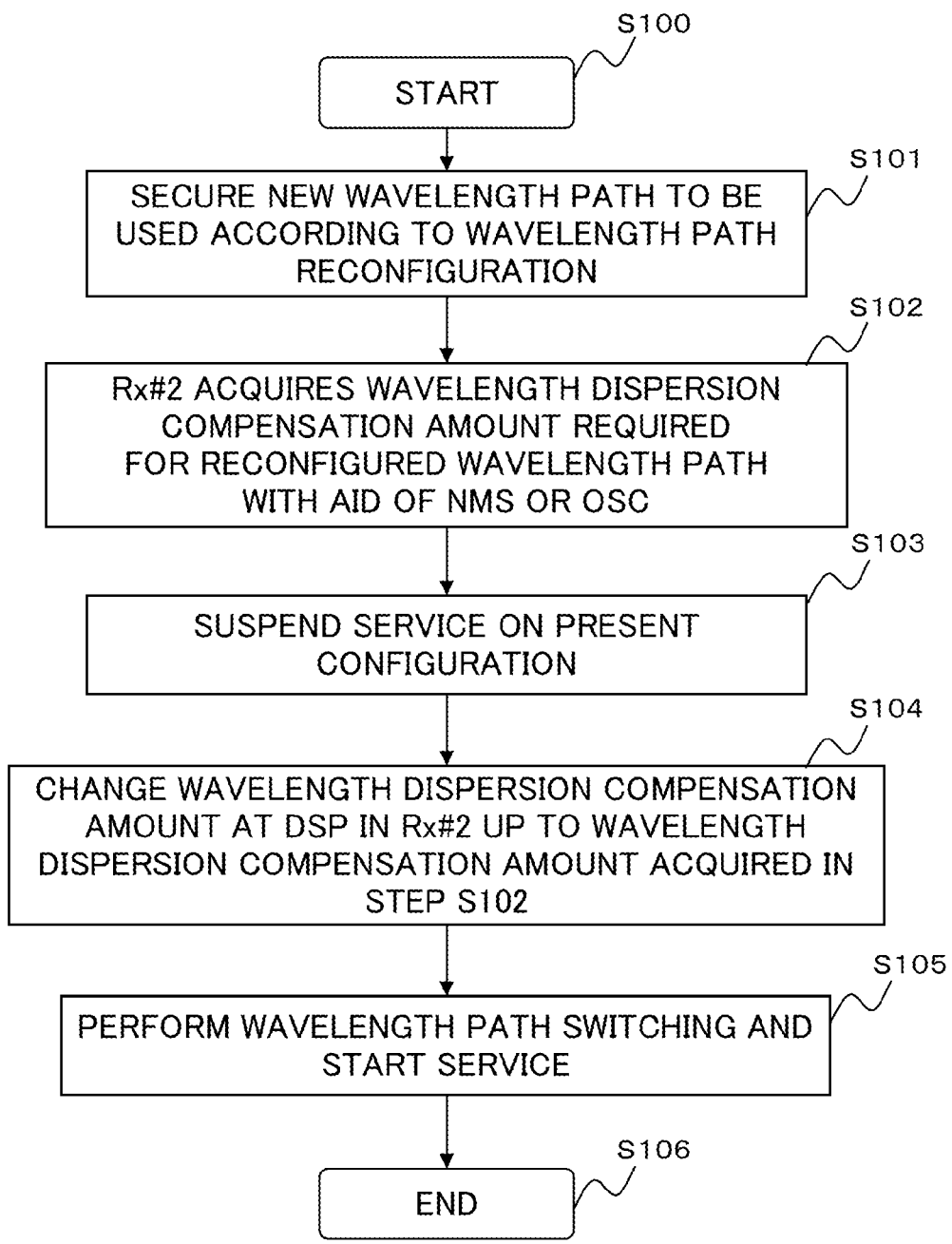

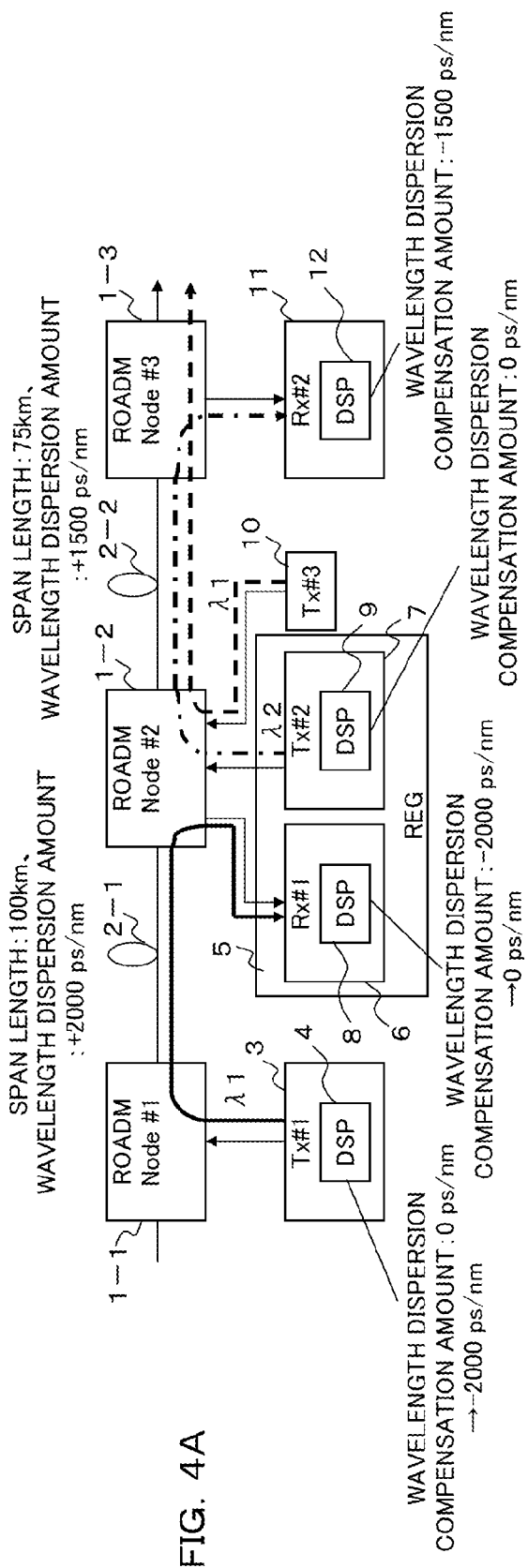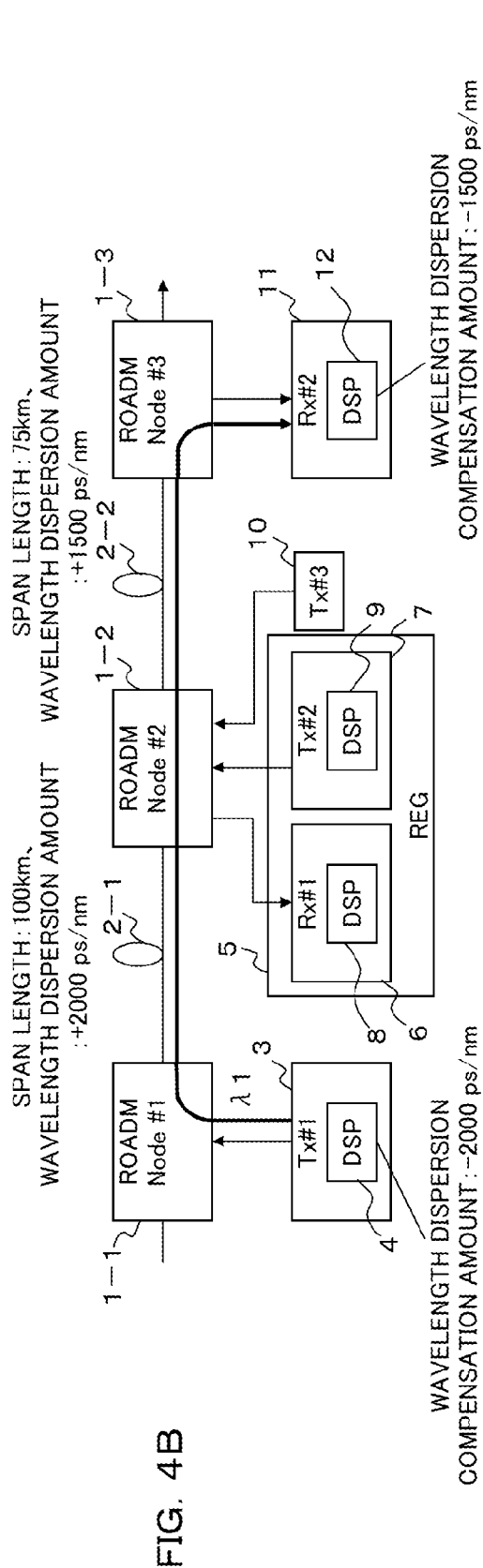
FIG. 4A
FIG. 4B

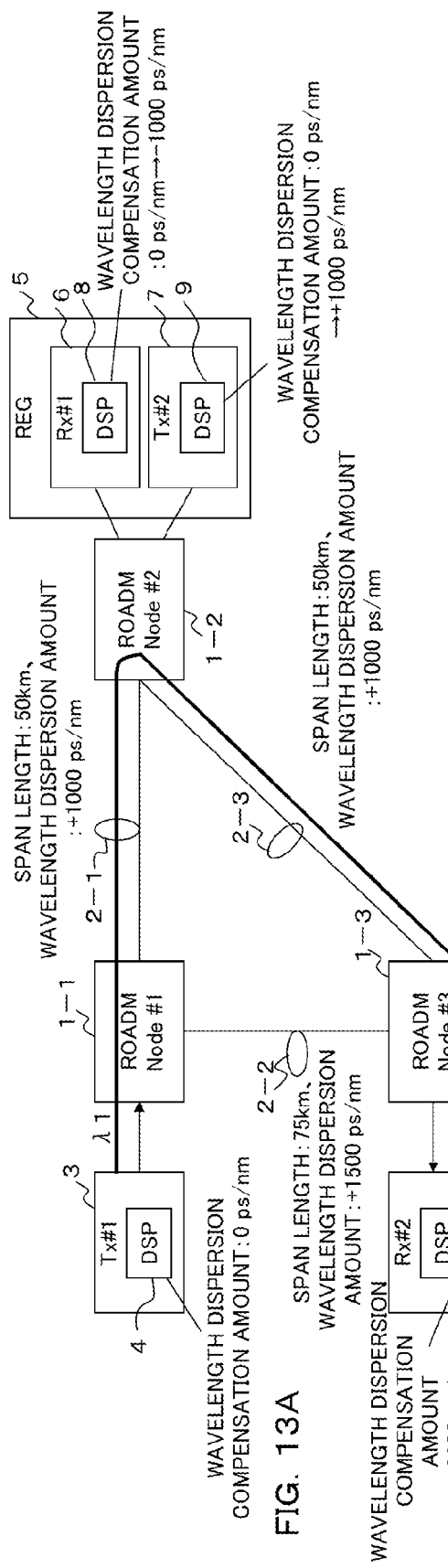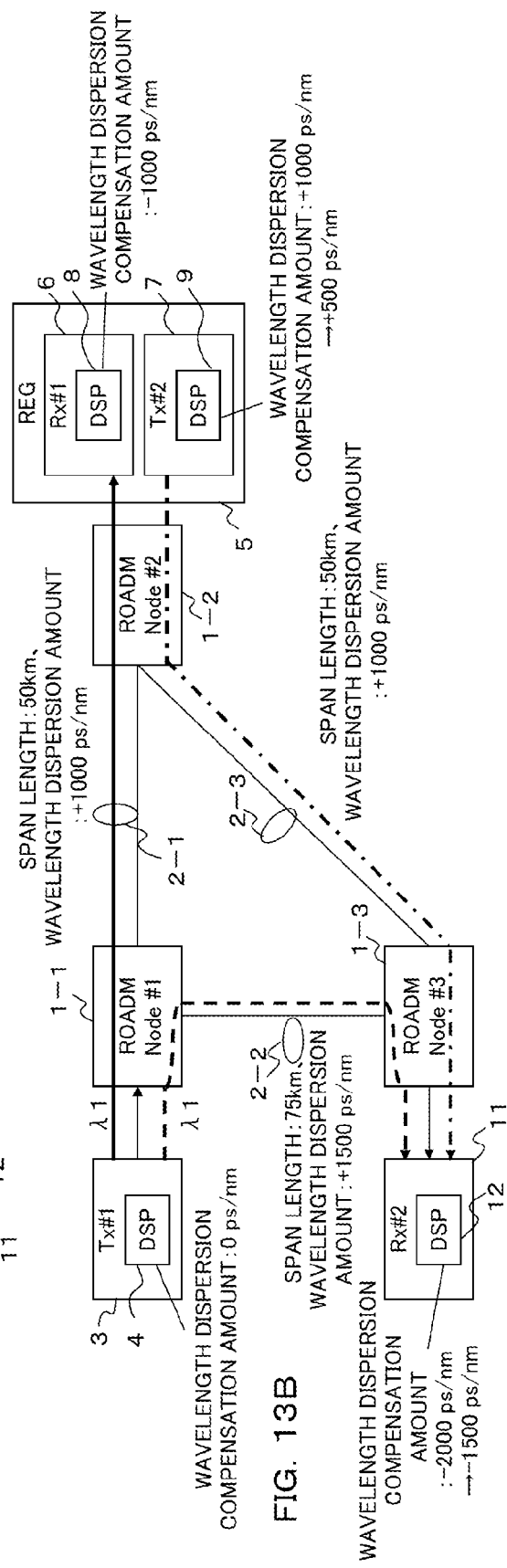

WAVELENGTH PATH SWITCHING METHOD, OPTICAL COMMUNICATION SYSTEM, OPTICAL COMMUNICATION DEVICE, OPTICAL REPEATER, AND NETWORK MANAGEMENT DEVICE

CROSS-REFERENCE TO RELATED APPLICATION

This application is a continuation application of International Application PCT/JP2011/076996, filed on Nov. 24, 2011 and designated the U.S., the entire contents of which are incorporated herein by reference.

FIELD

The present invention relates to a wavelength path switching method, an optical communication system, an optical communication device, an optical relay device, and a network management device.

BACKGROUND

An optical communication system that uses a wavelength division multiplexing (WDM) scheme of multiplexing optical signals of different wavelengths is known.

Such an optical communication system can configure a complex topology such as a ring interconnection and a mesh by using an optical add/drop multiplexer (OADM) that realizes adding/dropping and path switching of an optical signal for each wavelength.

Moreover, in the optical communication system, the bit rate of multiplexed optical signals is increasing and diversified optical signal modulation schemes are used. Thus, in order to cope with the increasing bit rate and the diversified modulation schemes, a method of flexibly allocating a wavelength bandwidth according to the bit rate and a modulation scheme of an optical signal.

In an optical communication system in which such a method is applied, in order to improve the utilization efficiency of the wavelength bandwidth, rearrangement of allocated wavelengths, switching of wavelength paths, and the like are performed frequently. Thus, it is necessary to change the allocated wavelength and path of a wavelength path in service. Here, the wavelength path means a communication path between two points connected by an optical signal of each wavelength.

For example, Japanese Laid-open Patent Publication No. 2009-147416 proposes a method of preventing a deterioration of signal quality after a path is switched in the 1+1 protection scheme by setting a wavelength dispersion compensation amount in a present optical path to be the same as a wavelength dispersion compensation amount in a reserve optical path in advance or setting a residual dispersion amount to zero.

SUMMARY

For example, when a wavelength path of an optical communication system is switched, a span length or the like changes before and after the wavelength path is switched and a wavelength dispersion amount also changes. Thus, it may be necessary to change the wavelength dispersion compensation amount.

Since it is not possible to transfer an optical signal through a first optical wavelength path or a second optical wavelength path when the wavelength dispersion compensation amount is being changed, a service suspension period of the optical communication system may be extended.

In the technique disclosed in Japanese Laid-open Patent Publication No. 2009-147416, while the wavelength dispersion compensation amount in the reserve optical path and the wavelength dispersion compensation amount in the present optical path are being combined, since it is not possible to provide a service in a path other than the reserve optical path, the service suspension period may be extended.

(1) According to a first aspect, a wavelength path switching method in an optical communication system including a plurality of optical communication devices that transfer a signal light and an optical relay device that relays the signal light, the method for switching a first wavelength path to a second wavelength path between a first optical communication device and a second optical communication device, the first wavelength path and the second wavelength path being among a plurality of wavelength paths, the first optical communication device and the second optical communication device being among the plurality of optical communication devices, the method includes: compensating, by at least one of the first optical communication device, the second optical communication device, and the optical relay device that relays in the first wavelength path, for wavelength dispersion in the first wavelength path; changing, by the first optical communication device or the second optical communication device, a wavelength dispersion compensation amount at the first optical communication device or the second optical communication device so that a wavelength dispersion in the second wavelength path is compensated; changing, by the optical relay device, a wavelength dispersion compensation amount at the optical relay device so that a total amount of a wavelength dispersion of the signal light compensated in the first wavelength path does not change substantially with the change in the wavelength dispersion compensation amount at the first optical communication device or the second optical communication device; and switching the first wavelength path to the second wavelength path after the wavelength dispersion compensation amount at the first optical communication device or the second optical communication device is changed to a value that can compensate for the wavelength dispersion in the second wavelength path.

(2) According to a second aspect, an optical communication system includes: a plurality of optical communication devices that transfer a signal light; and an optical relay device that relays the signal light, wherein at least one of a first optical communication device among the plurality of optical communication devices, a second optical communication device among the plurality of optical communication devices, and the optical relay device that relays a first wavelength path compensates for wavelength dispersion in the first wavelength path, the first optical communication device or the second optical communication device changes a wavelength dispersion compensation amount at the first optical communication device or the second optical communication device so that the wavelength dispersion in a second wavelength path is compensated, and the optical relay device changes a wavelength dispersion compensation amount at the optical relay device so that a total amount of wavelength dispersion of the signal light compensated in the first wavelength path does not change substantially with the change in the wavelength dispersion compensation amount at the first optical communication device or the second optical communication device, and the first wavelength path is switched to the second wavelength path after the wavelength dispersion compensation amount at the first optical communication device or the second optical communication device is changed to a value that can compensate for the wavelength dispersion in the second wavelength path.

(3) According to a third aspect, an optical communication device is the first optical communication device or the second optical communication device used in the optical communication system described above, wherein the wavelength dispersion compensation amount at the first optical communication device or the second optical communication device is changed so that the total amount of the wavelength dispersion of the signal light compensated in the first wavelength path does not change substantially with the change in the wavelength dispersion compensation amount at the optical relay device.

(4) According to a fourth aspect, an optical relay device is the optical relay device used in the optical communication system described above, wherein the wavelength dispersion compensation amount at the optical relay device is changed so that the total amount of the wavelength dispersion of the signal light compensated in the first wavelength path does not change substantially with the change in the wavelength dispersion compensation amount at the first optical communication device or the second optical communication device.

(5) According to a fifth aspect, a network management device that manages an optical communication system including a plurality of optical communication devices that transfer a signal light and an optical relay device that relays the signal light, the network management device is configured to: cause at least one of a first optical communication device, a second optical communication device, and the optical relay device that relays a first wavelength path to compensate for wavelength dispersion in the first wavelength path, the first optical communication device and the second optical communication device being among the plurality of optical communication devices; change a wavelength dispersion compensation amount at the first optical communication device or the second optical communication device so that wavelength dispersion in a second wavelength path is compensated; change a wavelength dispersion compensation amount at the optical relay device so that a total amount of wavelength dispersion of the signal light compensated in the first wavelength path does not change substantially with the change in the wavelength dispersion compensation amount at the first optical communication device or the second optical communication device; and switch the first wavelength path to the second wavelength path after the wavelength dispersion compensation amount at the first optical communication device or the second optical communication device is changed to a value that can compensate for the wavelength dispersion in the second wavelength path.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a flowchart illustrating an example of the wavelength path switching method in the optical communication system illustrated in FIGS. 2A and 2B;

FIGS. 4A and 4B are diagrams illustrating an example of a wavelength path switching method in an optical communication system according to an embodiment of the present invention;

FIGS. 13A and 13B are diagrams illustrating an example of a wavelength path switching method in an optical communication system according to a third modification example of the present invention;

DESCRIPTION OF EMBODIMENT(S)

Hereinafter, embodiments of the present invention will be described with reference to the drawings. The embodiments to be illustrated below are examples only, and it is not intended to exclude the application of various modifications and techniques that are not described in the embodiments below. That is, the embodiments can naturally be modified in various ways without departing from the spirit of the present invention.

Figure 1A:
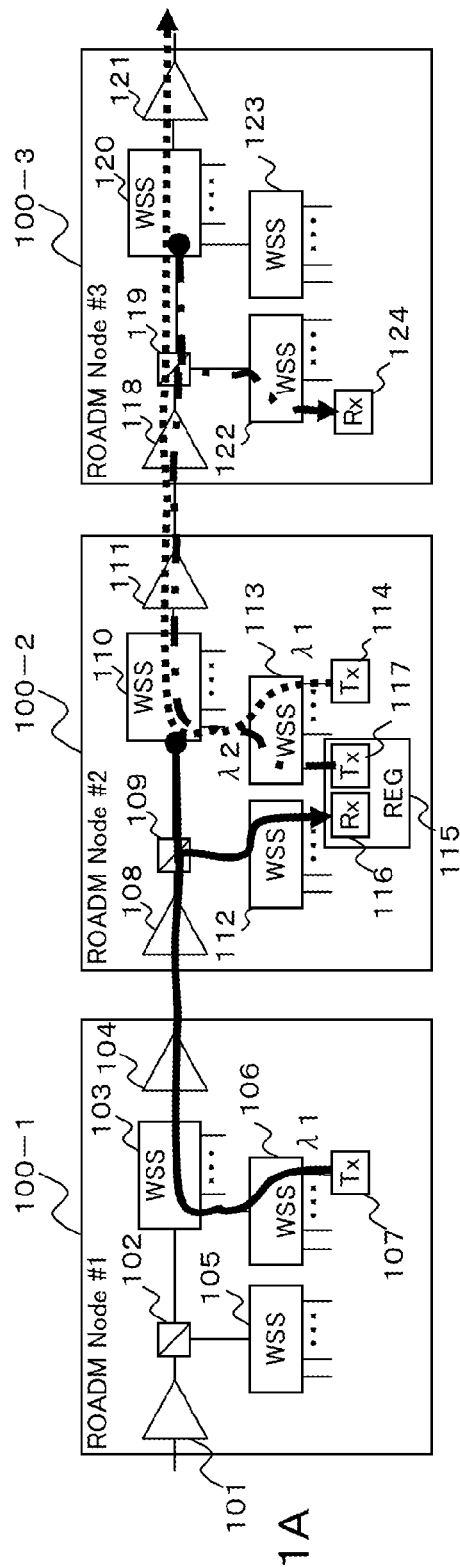
FIGS. 1A and 1B are diagrams illustrating an example of a wavelength path switching method in an optical communication system.
Figure 1B:
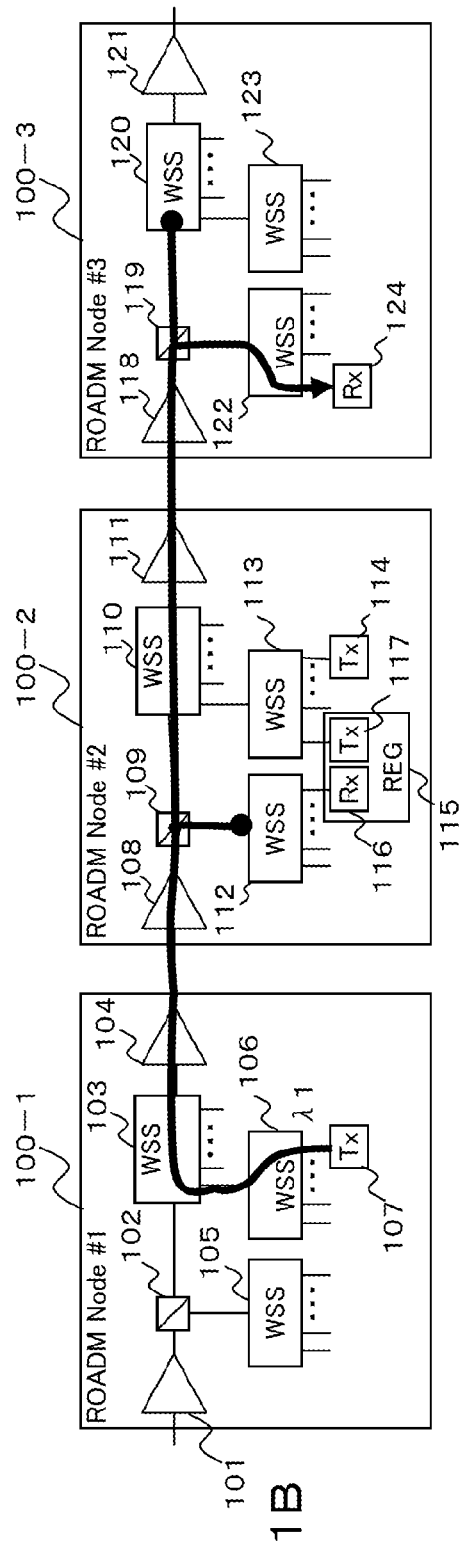

(1) Service Suspension Period of Optical Communication System During Switching of a Wavelength Path FIGS. 1A and 1B illustrate an example of a wavelength path switching method in an optical communication system. FIG. 1A illustrates an example of a wavelength path before the wavelength path is switched and FIG. 1B illustrates an example of a wavelength path after the wavelength path is switched.

The optical communication system illustrated in FIGS. 1A and 1B includes ROADM nodes 100-1 to 100-3 which are examples of an optical communication device capable of realizing adding/dropping and path switching of an optical signal for each wavelength, for example.

In FIGS. 1A and 1B, the ROADM nodes 100-1 to 100-3 are denoted by ROADM Node #1, ROADM Node #2, and ROADM Node #3, respectively, and the same notation will be sometimes used hereinbelow.

As an example, the ROADM node 100-1 includes an optical amplifier 101, an optical coupler 102, a wavelength selective switch (WSS) 103, an optical amplifier 104, a WSS 105, a WSS 106, and an optical transmitter (Tx) 107.

Moreover, as an example, the ROADM node 100-2 includes an optical amplifier 108, an optical coupler 109, a WSS 110, an optical amplifier 111, a WSS 112, a WSS 113, a Tx 114, and an optical repeater (REG) 115 that includes an optical receiver (Rx) 116 and a Tx 117.

Further, as an example, the ROADM node 100-3 includes an optical amplifier 118, an optical coupler 119, a WSS 120, an optical amplifier 121, a WSS 122, a WSS 123, and an Rx 124.

Here, in the example of FIG. 1A, a wavelength-multiplexed signal light input to the ROADM node 100-1 from an optical communication line is amplified by the optical amplifier 101 and is split by the optical coupler 102 and supplied to a path to the WSS 103 and a path to the WSS 105.

The WSS 105 selectively outputs a signal light of an optional wavelength included in the wavelength-multiplexed signal light split by the optical coupler 102.

Moreover, the Tx 107 transmits a signal light having a wavelength $\lambda 1$, and the signal light of the wavelength $\lambda 1$ transmitted from the Tx 107 is combined with the wavelength-multiplexed signal light after passing through the WSSs 106 and 103. The signal light having the wavelength $\lambda 1$ is referred to as the $\lambda 1$ signal light.

The wavelength-multiplexed signal light in which the $\lambda 1$ signal light is combined is amplified by the optical amplifier 104 and is output to the optical communication line. In FIG. 1A, a wavelength path of the $\lambda 1$ signal light transmitted from the Tx 107 is depicted by a bold solid line.

Moreover, the wavelength-multiplexed signal light input from the ROADM node 100-1 to the ROADM node 100-2 through the optical communication line is amplified by the optical amplifier 108 and is split by the optical coupler 109 and supplied to a path to the WSS 110 and a path to the WSS 112.

The WSS 110 blocks the $\lambda 1$ signal light included in the wavelength-multiplexed signal light split by the optical coupler 109, and the WSS 112 outputs the $\lambda 1$ signal light included in the wavelength-multiplexed signal light split by the optical coupler 109 to the Rx 116 of the REG 115.

The $\lambda 1$ signal light received by the Rx 116 is converted to a $\lambda 2$ signal light by the Tx 117 of the REG 115, and the $\lambda 2$ signal light transmitted from the Tx 117 is combined with the wavelength-multiplexed signal light after passing through the WSSs 113 and 110. The $\lambda 2$ signal light is a signal light having a wavelength $\lambda 2$.

Moreover, the Tx 114 transmits a signal light having the wavelength $\lambda 1$. The $\lambda 1$ signal light transmitted from the Tx 114 is combined with the wavelength-multiplexed signal light after passing through the WSSs 113 and 110.

The wavelength-multiplexed signal light in which the $\lambda 1$ and $\lambda 2$ signal lights are combined is amplified by the optical amplifier 111 and is output to the optical communication line. In FIG. 1A, a wavelength path of the $\lambda 2$ signal light transmitted from the Tx 117 is depicted by a bold one-dot-chain line.

Further, the wavelength-multiplexed signal light input from the ROADM node 100-2 to the ROADM node 100-3 through the optical communication line is amplified by the optical amplifier 118 and is split by the optical coupler 119 and supplied to a path to the WSS 120 and a path to the WSS 122.

The WSS 120 blocks the $\lambda 2$ signal light included in the wavelength-multiplexed signal light split by the optical coupler 119, and the WSS 122 outputs the $\lambda 2$ signal light included in the wavelength-multiplexed signal light split by the optical coupler 119 to the Rx 124.

The $\lambda 1$ signal light transmitted from the Tx 114 of the ROADM node 100-2 is transferred to another ROADM node (not illustrated) through the optical amplifier 118, the optical coupler 119, the WSS 120, and the optical amplifier 121 in a state of being multiplexed into the wavelength-multiplexed signal light. In FIG. 1A, a wavelength path of the $\lambda 1$ signal light transmitted from the Tx 114 is depicted by a bold dot line.

In the example illustrated in FIG. 1A, when a signal is transferred from the ROADM node 100-1 to the ROADM node 100-3, although the signal is transmitted from the Tx 107 of the ROADM node 100-1 using the $\lambda 1$ signal light, since the wavelength $\lambda 1$ is already used for the communication between the ROADM node 100-2 and the ROADM node 100-3, the wavelength of the signal light is converted from $\lambda 1$ to $\lambda 2$ by the REG 115 of the ROADM node 100-2, and the signal is transferred to the ROADM node 100-3 using the $\lambda 2$ signal light.

Here, as illustrated in FIG. 1B, it is assumed that the wavelength $\lambda 1$ used for the communication between the ROADM node 100-2 and the ROADM node 100-3 is deallocated and that the $\lambda 1$ signal light can be used for the communication between the ROADM node 100-2 and the ROADM node 100-3.

In this case, from the perspective of an improvement in the utilization efficiency of the wavelength bandwidth, when a signal is transferred from the ROADM node 100-1 to the ROADM node 100-3, a wavelength path (see the bold solid line and the bold one-dot-chain line in FIG. 1A) that involves the wavelength conversion from $\lambda 1$ to $\lambda 2$ may be switched to a wavelength path (see the bold sold line in FIG. 1B) in which the signal can be transferred using the $\lambda 1$ signal light. The switching process is realized when the WSSs 103, 105, 106, 110, 112, 113, 120, 122, 123, and the like in the ROADM nodes 100-1 to 100-3 are appropriately controlled according to a monitoring control signal light (OSC light) that can be transferred by an optical supervisory channel (OSC) and according to a network management device. The network management device is referred to as a NMS (Network Management System).

In the second optical wavelength path, as illustrated in FIG. 1B, the $\lambda 1$ signal light transmitted from the Tx 107 of the ROADM node 100-1 is blocked by the WSS 112 of the ROADM node 100-2 and the WSS 120 of the ROADM node 100-3 and is received by the Rx 124 of the ROADM node 100-3.

However, in this case, since a span length or the like in the wavelength path before and after the switching changes and the wavelength dispersion amount of the $\lambda 1$ signal light also changes, it may be necessary to change the wavelength dispersion compensation amount.

However, since it is not possible to transfer an optical signal through the first optical wavelength path or the second optical wavelength path when the wavelength dispersion compensation amount is being changed, the service suspension period of the optical communication system may be extended.

Figure 2A:
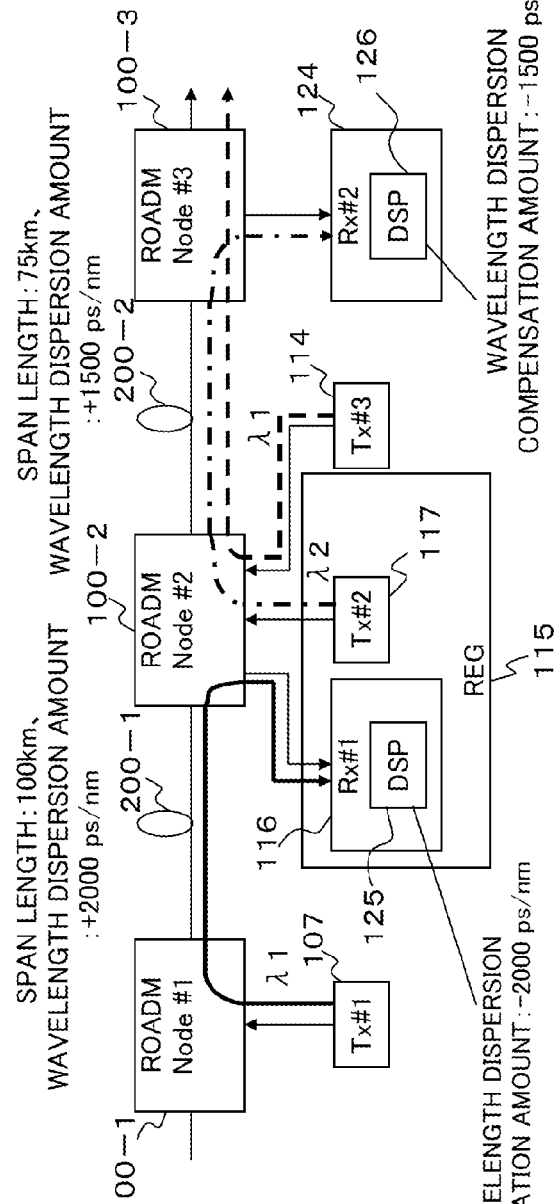
FIGS. 2A and 2B are diagrams illustrating an example of the wavelength path switching method in the optical communication system.
Figure 2B:
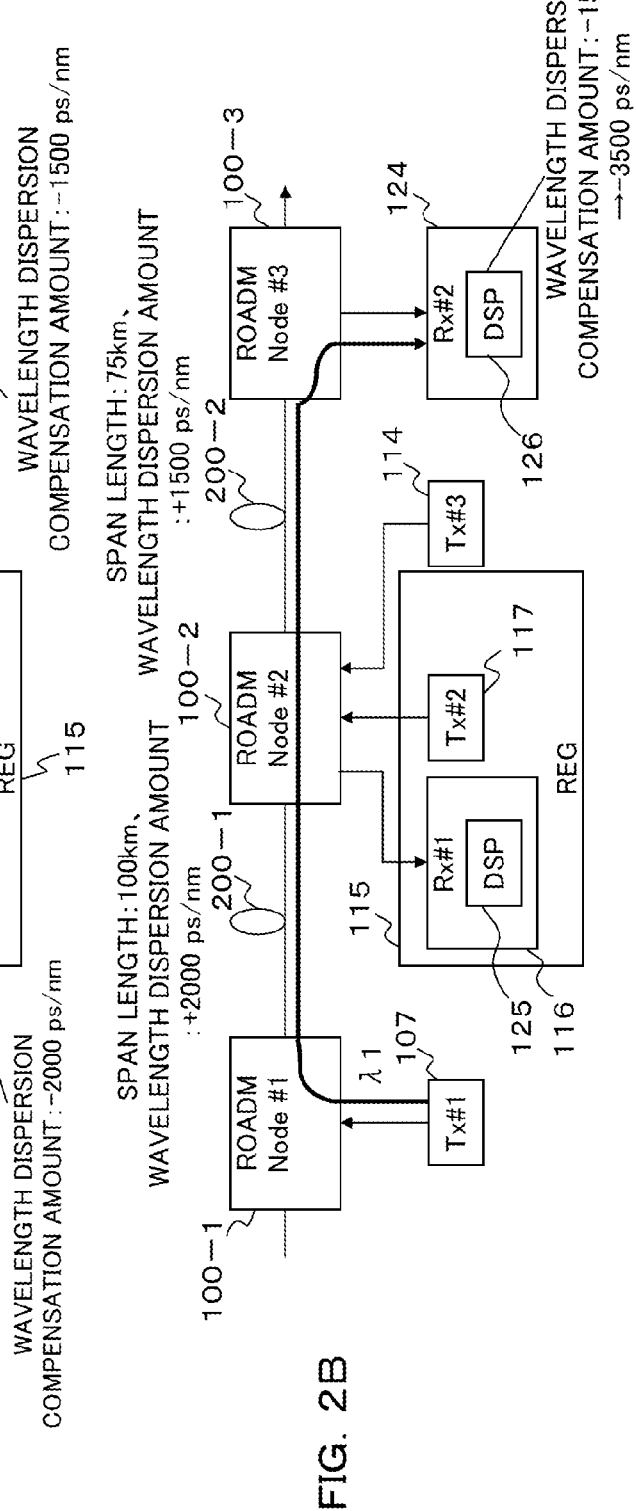

Here, a specific example of a change in the wavelength dispersion amount and the changing of the wavelength dispersion compensation amount occurring in the example of FIG. 1 is illustrated in FIGS. 2A and 2B. In FIGS. 2A and 2B, in order to simplify the illustration for description, some components of the ROADM nodes 100-1 to 100-3 are depicted outside the ROADM node.

In the example of FIGS. 2A and 2B, digital signal processors (DSPs) 125 and 126 in the Rx 116 (Rx#1) and the Rx 124 (Rx#2) perform a wavelength dispersion compensation process for each wavelength path. In the example of FIGS. 2A and 2B, an optical communication line 200-1 provided between the ROADM node 100-1 and the ROADM node 100-2 has a span length of 100 km and a wavelength dispersion amount of +2000 ps/nm. Moreover, an optical communication line 200-2 provided between the ROADM node 100-2 and the ROADM node 100-3 has a span length of 75 km and a wavelength dispersion amount of +1500 ps/nm.

Thus, in the example of FIG. 2A before a wavelength path is switched, the wavelength dispersion compensation amount at the DSP 125 in the Rx 116 is set to −2000 ps/nm, and the wavelength dispersion compensation amount at the DSP 126 in the Rx 124 is set to −1500 ps/nm. The wavelength dispersion compensation amounts at the DSPs 125 and 126 are set with the aid of an NMS, an OSC light, or the like, for example.

In the example of FIG. 2B after a wavelength path is switched, it is required that the wavelength dispersion compensation amount at the DSP 126 in the Rx 124 of the ROADM node 100-3 be set to −3500 ps/nm.

Here, an example of a method of changing the wavelength dispersion compensation amount at the DSP 126 is illustrated in FIG. 3.

As illustrated in FIG. 3, first, when the NMS or the like determines that a wavelength path is to be switched, the NMS, the OSC light, or the like initiates a procedure for changing a wavelength dispersion compensation amount (Step S100) to secure a second optical wavelength path (Step S101).

Subsequently, the Rx 124 (Rx#2) acquires a wavelength dispersion compensation amount (for example, −3500 ps/nm) required for the second optical wavelength path with the aid of the NMS, the OSC light, or the like (Step S102).

Moreover, the service in the first optical wavelength path is suspended by the NMS, the OSC light, or the like (Step S103), the wavelength dispersion compensation amount at the DSP 125 is changed from −1500 ps/nm before wavelength path switching to −3500 ps/nm after wavelength path switching (Step S104).

Finally, the respective WSSs are controlled by the NMS, the OSC light, or the like so that the wavelength path is switched. Moreover, the service in the wavelength path after reconfiguration (switching) is started (Step S105), and the changing procedure ends (Step S106).

However, in a period when the wavelength dispersion compensation amount at the DSP 126 is being changed, the balance between the wavelength dispersion amount and the wavelength dispersion compensation amount is not taken in both of the first optical wavelength path and the second optical wavelength path. Due to this, in that period, it is not possible to transfer the signal light, and the service is suspended.

That is, in the method illustrated in FIG. 3, the service suspension period until the wavelength dispersion compensation amount is completely changed and the service resumes after the service is stopped in order to change the wavelength dispersion compensation amount so as to cope with the switching of wavelength path is extended depending on the period required for changing the wavelength dispersion compensation amount.

(2) Embodiment of Present Invention

Here, a wavelength path switching method according to an embodiment of the present invention will be described.

FIGS. 4A and 4B are diagrams illustrating an example of a wavelength path switching method in an optical communication system. FIG. 4A illustrates an example of a wavelength path before the wavelength path is switched and FIG. 4B illustrates an example of a wavelength path after the wavelength path is switched.

The optical communication system illustrated in FIGS. 4A and 4B includes ROADM nodes 1-1 to 1-3 which are examples of an optical communication device capable of realizing adding/dropping and path switching of an optical signal for each wavelength, for example. In FIGS. 4A and 4B, the ROADM nodes 1-1 to 1-3 are denoted by ROADM Node #1, ROADM Node #2, and ROADM Node #3, respectively, and the same notation will be sometimes used hereinbelow. Moreover, the ROADM nodes 1-1 to 1-3 may be sometimes referred to as ROADM nodes 1 when the ROADM nodes are not distinguished from each other. Further, the number of ROADM nodes 1 is not limited to the number illustrated in FIGS. 4A and 4B. In addition, in FIGS. 4A and 4B, in order to simplify the illustration for description, some components of the ROADM nodes 1-1 to 1-3 are depicted outside the ROADM node similarly to FIGS. 2A and 2B.

Here, the ROADM node 1-1 includes an optical amplifier, an optical coupler, and a WSS (which are not illustrated), for example, similarly to the ROADM node 100-1 illustrated in FIGS. 1A and 1B, and includes an optical transmitter (Tx#1) 3 including a DSP 4.

Moreover, the ROADM node 1-2 includes an optical amplifier, an optical coupler, and a WSS (which are not illustrated), for example, similarly to the ROADM node 100-2 illustrated in FIGS. 1A and 1B, and includes an optical repeater (REG) 5 including an optical receiver (Rx#1) 6 and an optical transmitter (Tx#2) 7, and an optical transmitter (Tx#3) 10. The Rx#1 includes a DSP 8, and the Tx#2 includes a DSP 9.

Further, the ROADM node 1-3 includes an optical amplifier, an optical coupler, and a WSS (which are not illustrated), for example, similarly to the ROADM node 100-3 illustrated in FIGS. 1A and 1B, and includes an optical receiver (Rx#2) 11 including a DSP 12.

In the example of FIGS. 4A and 4B, a wavelength dispersion compensation process for each wavelength path is performed by the DSP 4 in the Tx 3 (Tx#1), the DSP 8 in the Rx 6 (Rx#1), and the DSP 12 in the Rx 11 (Rx#2). In the example of FIGS. 4A and 4B, an optical communication line 2-1 provided between the ROADM node 1-1 and the ROADM node 1-2 has a span length of 100 km and a wavelength dispersion amount of +2000 ps/nm. Moreover, an optical communication line 2-2 provided between the ROADM node 1-2 and the ROADM node 1-3 has a span length of 75 km and a wavelength dispersion amount of +1500 ps/nm.

Here, in the example illustrated in FIG. 4A, when a signal is transferred from the ROADM node 1-1 to the ROADM node 1-3, although the signal is transmitted from the Tx 3 of the ROADM node 1-1 using a λ1 signal light (see the bold solid line in FIG. 4A), since the wavelength λ1 is already used for the communication between the ROADM node 1-2 and the ROADM node 1-3 (see the bold dot line in FIG. 4A), the wavelength of the signal light is converted from λ1 to λ2 by the REG 5 of the ROADM node 1-2, and the signal is transferred to the ROADM node 1-3 using the λ2 signal light (see the bold one-dot-chain line in FIG. 4A).

Thus, in the example of FIG. 4A before a wavelength path is switched, first, in order to compensate for the wavelength dispersion of +2000 ps/nm, of the λ1 signal light compensated in the optical communication line 2-1, the wavelength dispersion compensation amount at the DSP 4 in the Tx 3 is set to 0 ps/nm, and the wavelength dispersion compensation amount at the DSP 8 in the Rx 6 is set to −2000 ps/nm.

Moreover, in order to compensate for the wavelength dispersion of +1500 ps/nm, of the λ2 signal light compensated in the optical communication line 2-2, the wavelength dispersion compensation amount at the DSP 9 in the Tx 7 is set to 0 ps/nm, and the wavelength dispersion compensation amount at the DSP 12 in the Rx 11 is set to −1500 ps/nm.

The wavelength dispersion compensation amounts at the DSPs 4, 8, 9, and 12 may be set using an NMS (not illustrated), an OSC light, or the like, for example.

Here, it is assumed that the wavelength λ1 used for the communication between the ROADM node 1-2 and the ROADM node 1-3 is deallocated and that the λ1 signal light can be used for the communication between the ROADM node 1-2 and the ROADM node 1-3.

In this case, when the NMS or the like determines that a wavelength path is to be switched as indicated by the bold solid line in FIG. 4B, the wavelength dispersion compensation amount at the DSP 12 in the Rx 11 is not changed, but, for example, the wavelength dispersion compensation amount at the DSP 4 in the Tx 3 is changed from 0 ps/nm to −2000 ps/nm, and the wavelength dispersion compensation amount at the DSP 8 in the Rx 6 is changed from −2000 ps/nm to 0 ps/nm. When the wavelength dispersion compensation amounts at the DSPs 4 and 8 are changed, it is desirable that the points in time, when the wavelength dispersion compensation amounts at the DSPs 4 and 8 are changed, be controlled so that a total amount of wavelength dispersion of the λ1 signal light compensated in the path indicated by the bold solid line in FIG. 4A does not change but maintains −2000 ps/nm. For example, the points in time, when the wavelength dispersion compensation amounts at the DSPs 4 and 8 are changed, may be controlled so as to be the same, or the wavelength dispersion compensation amounts at the DSPs 4 and 8 may be changed gradually so that, even when the points in time are not the same, the service of the communication system is not suspended.

Figure 5:
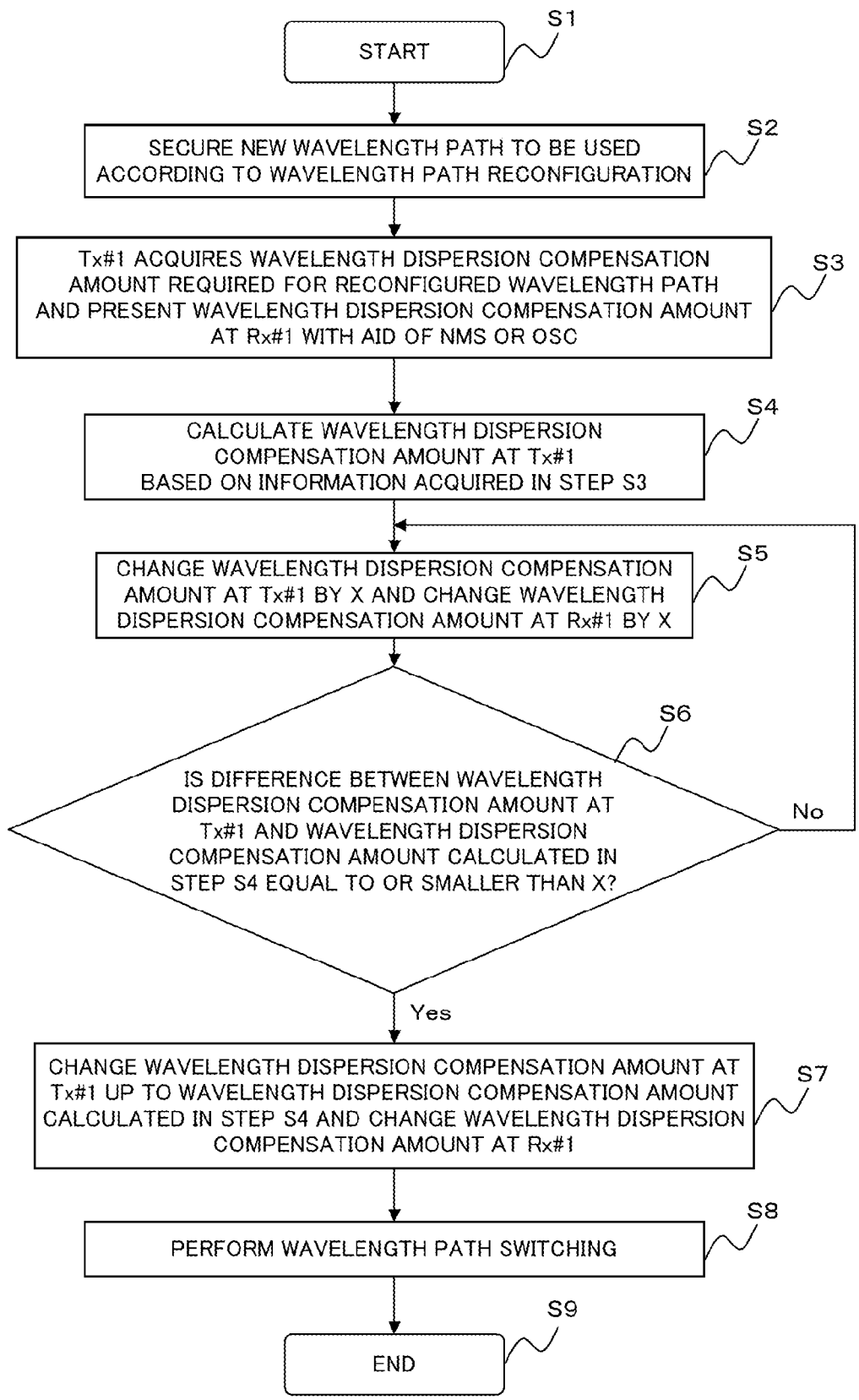
FIG. 5 is a flowchart illustrating an example of the wavelength path switching method in the optical communication system illustrated in FIGS. 4A and 4B.

That is, as illustrated in FIG. 5, first, when it is determined that the wavelength path is to be changed, a procedure for changing a wavelength dispersion compensation amount starts (Step S1).

When the second optical wavelength path (see the bold solid line in FIG. 4B) is secured with the aid of the NMS, the OSC light, or the like (Step S2), the Tx 3 acquires a wavelength dispersion compensation amount (for example, −3500 ps/nm) required for the second optical wavelength path and a present wavelength dispersion compensation amount (for example, −2000 ps/nm) on the Rx 6 with the aid of the NMS, the OSC light, or the like (Step S3).

Subsequently, the Tx 3 calculates a wavelength dispersion compensation amount (for example, −2000 ps/nm) required for the Tx 3 after the wavelength path switching based on the respective items of information acquired in Step S3 (Step S4).

Subsequently, the Tx 3 changes the wavelength dispersion compensation amount at the DSP 4 by a certain change amount X (>0) so that the absolute value of the wavelength dispersion compensation amount at the DSP 4 increases, and the Rx 6 changes the wavelength dispersion compensation amount at the DSP 8 by a certain change amount X (>0) so that the absolute value of the wavelength dispersion compensation amount at the DSP 8 decreases (Step S5). The certain change amount X is desirably a very small wavelength dispersion compensation amount (within a dispersion tolerance) that does not affect communication. That is, it is desirable that a certain dispersion tolerance be satisfied so that the service of the communication system continues even when the wavelength dispersion compensation amount is changed by the amount of X. For example, even when the difference between a present actual wavelength dispersion amount and a wavelength dispersion compensation amount is approximately several 100 ps/nm, since the wavelength dispersion can be compensated without any penalty by the digital signal processing of the DSP 8 and the like, a small margin may be added to set X to approximately 100 ps/nm, for example.

Subsequently, the Tx 3 determines whether the difference between the present wavelength dispersion compensation amount at the DSP 4 and the wavelength dispersion compensation amount (for example, −2000 ps/nm) calculated in Step S4 is equal to or smaller than the certain change amount X (Step S6).

When the difference between the present wavelength dispersion compensation amount at the DSP 4 and the wavelength dispersion compensation amount (for example, −2000 ps/nm) calculated in Step S4 is larger than the certain change amount X (No route in Step S6), the Tx 3 and the Rx 6 repeat the processes of steps S5 and S6.

On the other hand, when the difference between the present wavelength dispersion compensation amount at the DSP 4 and the wavelength dispersion compensation amount (for example, −2000 ps/nm) calculated in Step S4 is equal to or smaller than the certain change amount X (Yes route in Step S6), the Tx 3 changes the wavelength dispersion compensation amount at the DSP 4 up to the wavelength dispersion compensation amount (for example, −2000 ps/nm) calculated in Step S4, and the Rx 6 changes the wavelength dispersion compensation amount at the DSP 8 up to 0 ps/nm (Step S7).

After that, the WSSs as switches for switching a path are controlled with the aid of the NMS, the OSC light, or the like with the service of the optical communication system continued, whereby switching of a wavelength path is performed (Step S8), and the process ends (Step S9).

As described above, according to the present example, it is possible to switch a wavelength path while continuing the service. Due to this, although instantaneous interruption resulting from switching of WSSs may occur when a wavelength path is switched, since it is possible to obviate a substantial service suspension period, it is possible to shorten the service suspension period of the optical communication system. That is, it is possible to accelerate a wavelength path switching operation.

Figure 6:
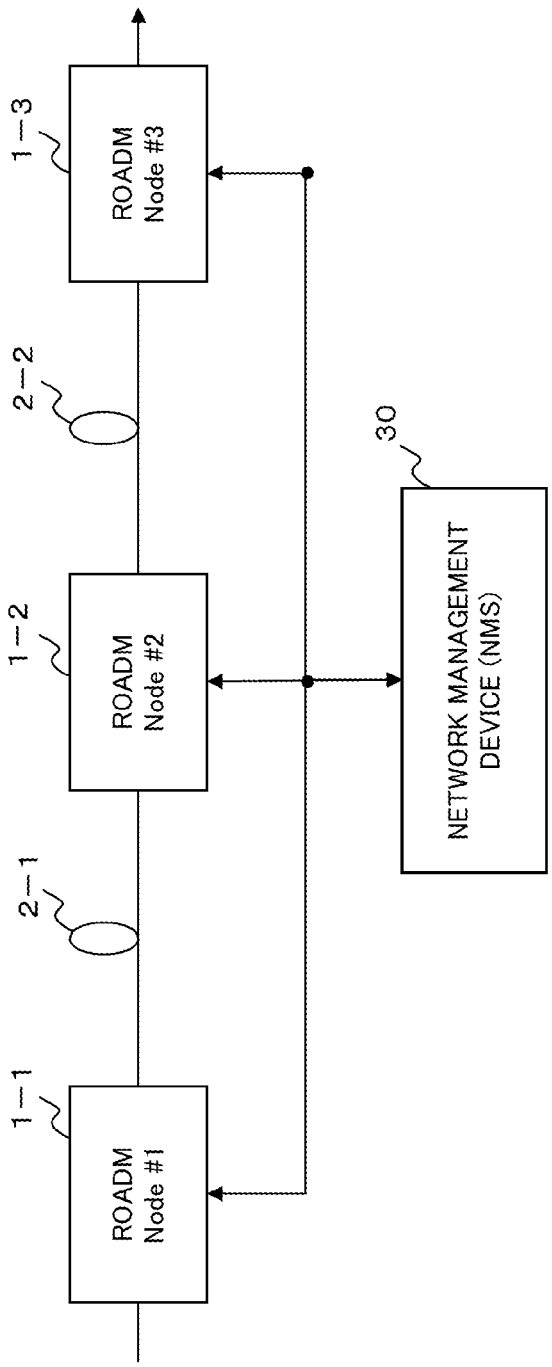
FIG. 6 is a diagram illustrating a specific configuration of the optical communication system illustrated in FIGS. 4A and 4B.

In the above-described example, although the Tx 3 and the Rx 6 are the subjects of the operations of changing the dispersion compensation amounts illustrated in FIG. 5, the NMS may perform the respective operations. In this case, as illustrated in FIG. 6, an NMS 30 connected to each ROADM node 1 can perform the operations of changing the dispersion compensation amounts illustrated in FIG. 5 with the aid of an OSC light, a supervisory (SV) signal, or the like. Moreover, as illustrated in FIG. 7, SV signal controllers (SVC) 40-1 to 40-3 that control the respective processes with the aid of the SV signal may cause each ROADM node 1, each NMS 30, or the like to perform the respective operations of changing the dispersion compensation amounts illustrated in FIG. 5.

As illustrated in FIG. 6, when the NMS 30 manages the ROADM nodes 1 in a centralized manner, for example, the NMS 30 stores the wavelength dispersion amounts in the respective communication lines 2-1 to 2-3, the wavelength dispersion compensation amounts of the DSPs 4, 8, 9, and 12, and the like.

Figure 7:
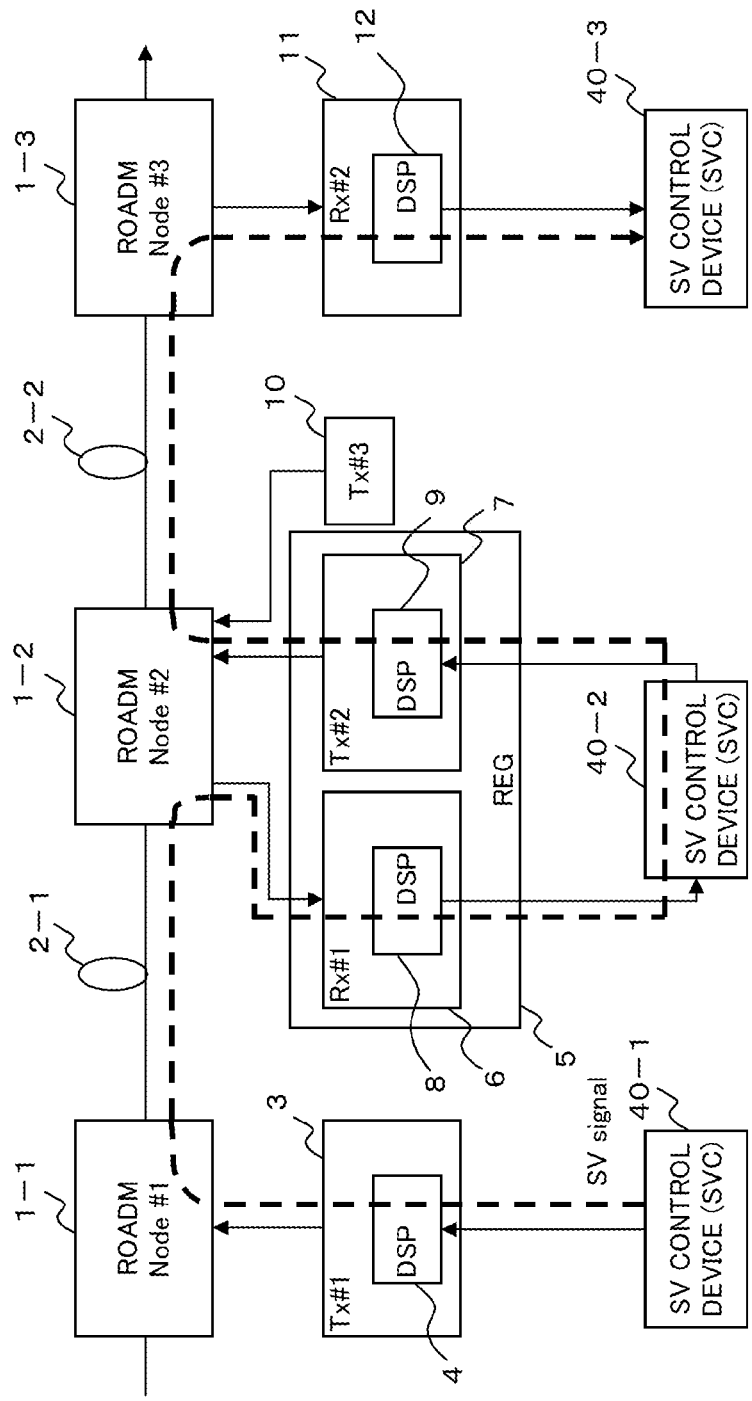
FIG. 7 is a diagram illustrating a specific configuration of the optical communication system illustrated in FIGS. 4A and 4B.

Moreover, as illustrated in FIG. 7, when the wavelength dispersion compensation amounts of the DSPs 4, 8, 9, and 12 are changed with the aid of an OSC light or an SV signal, for example, information used for switching (reconfiguring) a wavelength path can be obtained by allowing the ROADM nodes 1 to transfer and receive various items of information. The SV signal includes a control signal or the like superimposed in the same band as a data signal, for example.

In this case, when the ROADM nodes 1 constantly change the setting of the wavelength dispersion compensation amount with the aid of the NMS or the SVC, the NMS or the SVC notifies the ROADM nodes 1 having the DSP that changes the wavelength dispersion compensation amount of the changed wavelength dispersion compensation amount and the value of the change amount X with the aid of the OSC light, the SV signal, or the like.

Moreover, the NMS or the SVC instructs the ROADM nodes 1 to change the wavelength dispersion compensation amount by the change amount X in a direction to approach the changed wavelength dispersion compensation amount with the aid of the OSC light, the SV signal, or the like, and the ROADM nodes 1 notify the NMS or the SVC of whether the changing of the wavelength dispersion compensation amount has been completed with the aid of the OSC light, the SV signal, or the like. The above-mentioned processes are repeated until the wavelength dispersion compensation amount at the ROADM nodes 1 becomes the changed wavelength dispersion compensation amount, whereby the procedure for changing the wavelength dispersion compensation amount ends.

Moreover, when the ROADM nodes 1 communicate with the NMS or the SVC only at the start of the procedure for changing the wavelength dispersion compensation amount, for example, the NMS or the SVC notifies the ROADM nodes 1 having the DSP that changes the wavelength dispersion compensation amount of the changed wavelength dispersion compensation amount, the value of the change amount X, the start time at which the changing of the wavelength dispersion compensation amount starts and the time interval for performing change with the aid of the OSC light, the SV signal, or the like. In this case, it is required that the time (clocks) on the respective ROADM nodes 1 is synchronized.

Moreover, when the ROADM nodes 1 perform the process for changing the wavelength dispersion compensation amount with the start time and the time interval notified from the NMS or the SVC until the wavelength dispersion compensation amount reaches the changed wavelength dispersion compensation amount, whereby it is possible to complete the procedure for changing the wavelength dispersion compensation amount. In this case, it is possible to obtain the same advantages as the embodiment and to reduce the network load of the optical communication system since the amount of communications between the respective ROADM nodes 1 and the NMS is suppressed.

Further, in the above-described example, the wavelength dispersion compensation amount at the DSP 4 in the Tx 3 and the wavelength dispersion compensation amount at the DSP 8 in the Rx 6 are changed without changing the wavelength dispersion compensation amount at the DSP 12 in the Rx 11. However, as illustrated in FIGS. 8A and 8B, for example, the wavelength dispersion compensation amount at the DSP 9 in the Tx 7 and the wavelength dispersion compensation amount at the DSP 12 in the Rx 11 may be changed without changing the wavelength dispersion compensation amount at the DSP 4 in the Tx 3 and the wavelength dispersion compensation amount at the DSP 8 in the Rx 6.

Figure 8:
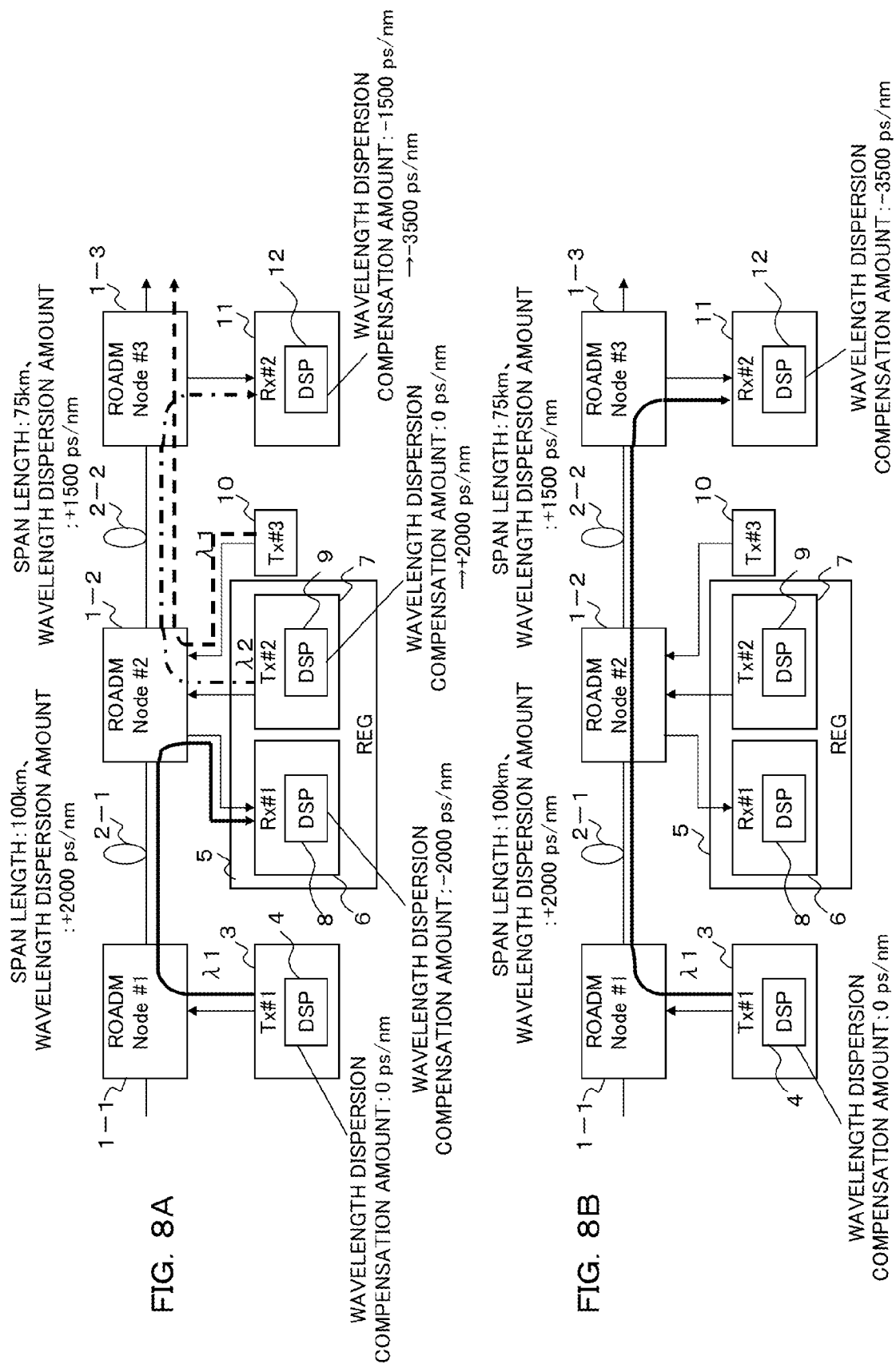
FIGS. 8A and 8B are diagrams illustrating an example of a wavelength path switching method in an optical communication system according to an embodiment of the present invention.

Here, in the example illustrated in FIG. 8A, before wavelength path switching, first, in order to compensate for the wavelength dispersion of +2000 ps/nm, of the λ1 signal light compensated in the optical communication line 2-1, the wavelength dispersion compensation amount at the DSP 4 in the Tx 3 is set to 0 ps/nm, and the wavelength dispersion compensation amount at the DSP 8 in the Rx 6 is set to −2000 ps/nm.

Moreover, in order to compensate for the wavelength dispersion of +1500 ps/nm, of the λ2 signal light compensated in the optical communication line 2-2, the wavelength dispersion compensation amount at the DSP 9 in the Tx 7 is set to 0 ps/nm, and the wavelength dispersion compensation amount at the DSP 12 in the Rx 11 is set to −1500 ps/nm.

The wavelength dispersion compensation amounts at the DSPs 4, 8, 9, and 12 are set with the aid of the NMS, the OSC light, or the like, for example.

Here, it is assumed that the wavelength λ1 used for the communication between the ROADM node 1-2 and the ROADM node 1-3 is deallocated and that the λ1 signal light can be used for the communication between the ROADM node 1-2 and the ROADM node 1-3.

In this case, when the NMS or the like determines that a wavelength path is to be switched as indicated by a bold solid line of FIG. 8B, the wavelength dispersion compensation amount at the DSP 4 in the Tx 3 and the wavelength dispersion compensation amount at the DSP 8 in the Rx 6 are not changed, but, for example, the wavelength dispersion compensation amount at the DSP 9 in the Tx 7 is changed from 0 ps/nm to +2000 ps/nm and the wavelength dispersion compensation amount at the DSP 12 in the Rx 11 is changed from −1500 ps/nm to −3500 ps/nm with the aid of the NMS, the OSC light, or the like. When the wavelength dispersion compensation amounts at the DSPs 9 and 12 are changed, it is desirable that the points in time, when the wavelength dispersion compensation amounts at the DSPs 9 and 12 are changed, be controlled so that a total amount of wavelength dispersion of the λ2 signal light compensated in the path indicated by the bold one-dot-chain line in FIG. 8A does not change but maintains −1500 ps/nm. For example, the points in time when the wavelength dispersion compensation amounts at the DSPs 9 and 12 are changed may be controlled so as to be the same, or the wavelength dispersion compensation amounts at the DSPs 9 and 12 may be changed gradually so that, even when the points in time are not the same, the service of the communication system is not suspended.

Figure 9:
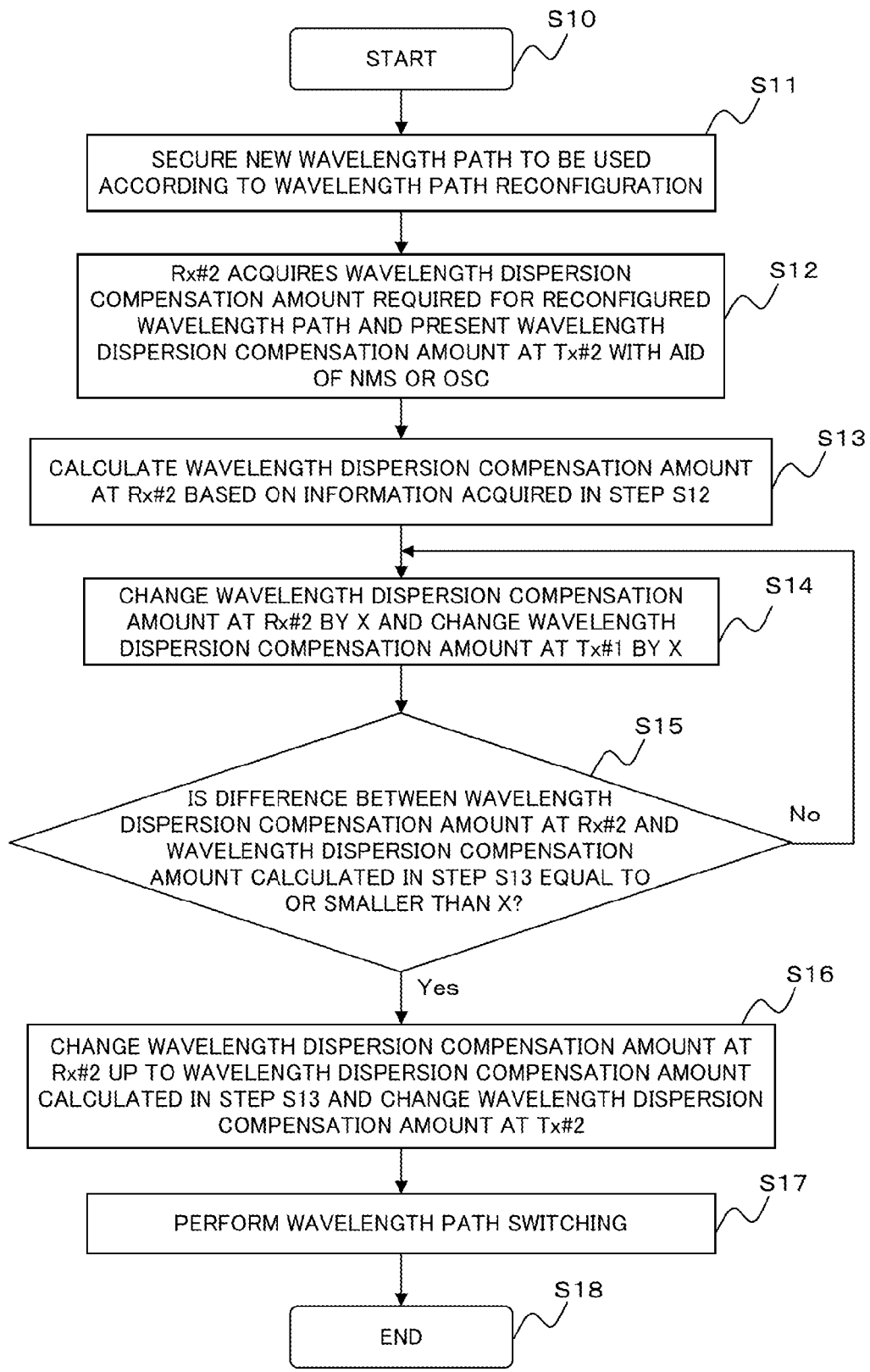
FIG. 9 is a flowchart illustrating an example of the wavelength path switching method in the optical communication system illustrated in FIGS. 8A and 8B.

That is, in this example, as illustrated in FIG. 9, first, when it is determined that a wavelength path is to be switched, the NMS, the OSC light, or the like initiates a procedure for changing a wavelength dispersion compensation amount (Step S10).

When the second optical wavelength path (see the bold solid line in FIG. 8B) is secured with the aid of the NMS, the OSC light, or the like (Step S11), the Rx 11 acquires a wavelength dispersion compensation amount (for example, −3500 ps/nm) required for the second optical wavelength path and a present wavelength dispersion compensation amount (for example, 0 ps/nm) on the Tx 7 with the aid of the NMS, the OSC light, or the like (Step S12).

Subsequently, the Rx 11 calculates a wavelength dispersion compensation amount (for example, −3500 ps/nm)

required for the Rx 11 after the wavelength path switching based on the respective items of information acquired in Step S12 (Step S13).

Subsequently, the Rx 11 changes the wavelength dispersion compensation amount at the DSP 12 by a certain change amount X (>0) so that the absolute value of the wavelength dispersion compensation amount at the DSP 12 increases, and the Tx 7 changes the wavelength dispersion compensation amount at the DSP 9 by a certain change amount X (>0) so that the absolute value of the wavelength dispersion compensation amount at the DSP 9 increases (Step S14). The certain change amount X is desirably a very small wavelength dispersion compensation amount (within a dispersion tolerance) that does not affect communication. That is, it is desirable that the service of the communication system continue even when the wavelength dispersion compensation amount is changed by the amount of X. For example, even when the difference between a present actual wavelength dispersion amount and a wavelength dispersion compensation amount is approximately several 100 ps/nm, since the wavelength dispersion can be compensated without any penalty by the digital signal processing of the DSPs 9 and 12 and the like, a small margin may be added to set X to approximately 100 ps/nm, for example.

Subsequently, the Rx 11 determines whether the difference between the present wavelength dispersion compensation amount at the DSP 12 and the wavelength dispersion compensation amount (for example, −3500 ps/nm) calculated in Step S13 is equal to or smaller than the certain change amount X (Step S15).

When the difference between the present wavelength dispersion compensation amount at the DSP 12 and the wavelength dispersion compensation amount (for example, −3500 ps/nm) calculated in Step S13 is larger than the certain change amount X (No route in Step S15), the Rx 11 and the Tx 7 repeat the processes of steps S14 and S15.

On the other hand, when the difference between the present wavelength dispersion compensation amount at the DSP 12 and the wavelength dispersion compensation amount (for example, −3500 ps/nm) calculated in Step S13 is equal to or smaller than the certain change amount X (Yes route in Step S15), the Rx 11 changes the wavelength dispersion compensation amount at the DSP 12 up to the wavelength dispersion compensation amount (for example, −3500 ps/nm) calculated in Step S13, and the Tx 7 changes the wavelength dispersion compensation amount at the DSP 9 up to +2000 ps/nm (Step S16).

After that, the WSSs are controlled with the aid of the NMS, the OSC light, or the like with the service of the optical communication system continued, whereby switching of a wavelength path is performed (Step S17), and the process ends (Step S18).

The respective operations illustrated in FIG. 9 may be performed by the NMS or the SVC.

As described above, according to the present example, it is possible to switch a wavelength path while continuing the service. Due to this, although instantaneous interruption resulting from switching of WSSs may occur when a wavelength path is switched, since it is possible to obviate a substantial service suspension period, it is possible to shorten the service suspension period of the optical communication system. That is, it is possible to accelerate a wavelength path switching operation.

(3) First Modification Example

Figure 10:
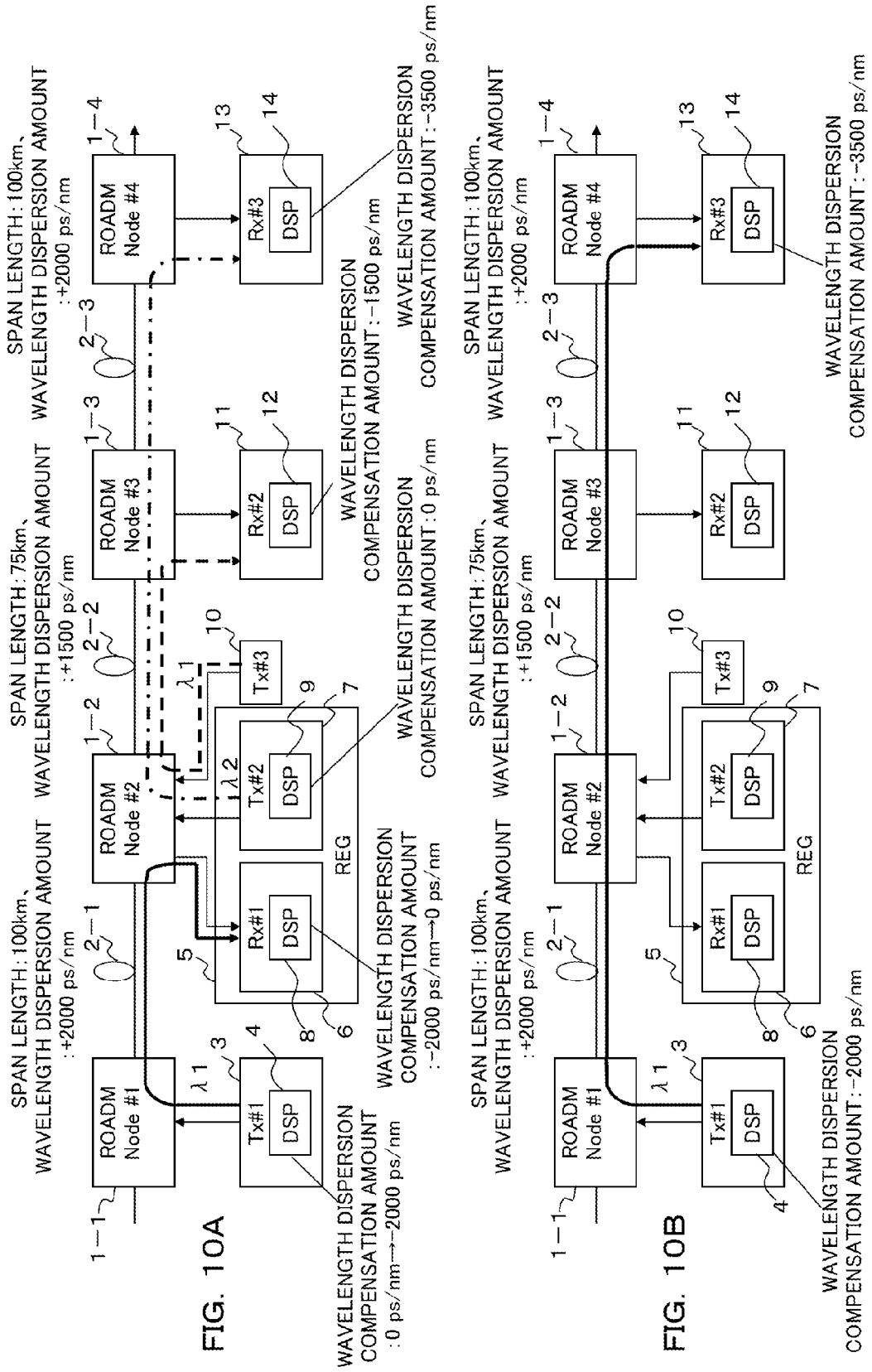
FIGS. 10A and 10B are diagrams illustrating an example of a wavelength path switching method in an optical communication system according to a first modification example of the present invention.

FIGS. 10A and 10B are diagrams illustrating an example of a wavelength path switching method according to a first modification example. FIG. 10A illustrates an example of a wavelength path before the wavelength path is switched and FIG. 10B illustrates an example of a wavelength path after the wavelength path is switched.

The optical communication system illustrated in FIGS. 10A and 10B includes ROADM nodes 1-1 to 1-4 which are examples of an optical communication device capable of realizing adding/dropping and path switching of an optical signal for each wavelength, for example. In FIGS. 10A and 10B, the ROADM nodes 1-1 to 1-4 are denoted by ROADM Node #1, ROADM Node #2, ROADM Node #3, and ROADM Node #4, respectively, and the same notation will be sometimes used hereinbelow. Moreover, the ROADM nodes 1-1 to 1-4 may be sometimes referred to as ROADM nodes 1 when the ROADM nodes are not distinguished from each other. Further, the number of ROADM nodes 1 is not limited to the number illustrated in FIGS. 10A and 10B. In addition, in FIGS. 10A and 10B, in order to simplify the illustration for description, some components of the ROADM nodes 1-1 to 1-4 are depicted outside the ROADM node similarly to the examples of FIGS. 2A and 2B and FIGS. 4A and 4B. Furthermore, the same components in FIGS. 10A and 10B as those described in FIGS. 4A and 4B have the same functions as those described in FIGS. 4A and 4B, and description thereof will not be provided.

Here, the ROADM node 1-4 includes an optical amplifier, an optical coupler, and a WSS (which are not illustrated), for example, similarly to the ROADM node 100-3 illustrated in FIGS. 1A and 1B, and includes an optical receiver (Rx#3) 13 having a DSP 14.

In the example of FIGS. 10A and 10B, a wavelength dispersion compensation process for each wavelength path is performed by the DSP 4 in the Tx 3 (Tx#1), the DSP 8 in the Rx 6 (Rx#1), the DSP 12 in the Rx 11 (Rx#2), and the DSP 14 in the Rx 13 (Rx#3). In the example of FIGS. 10A and 10B, an optical communication line 2-1 provided between the ROADM node 1-1 and the ROADM node 1-2 has a span length of 100 km and a wavelength dispersion amount of +2000 ps/nm. Moreover, an optical communication line 2-2 provided between the ROADM node 1-2 and the ROADM node 1-3 has a span length of 75 km and a wavelength dispersion amount of +1500 ps/nm. Further, the optical communication line 2-3 provided between the ROADM node 1-3 and the ROADM node 1-4 has a span length of 100 km and a wavelength dispersion amount of +2000 ps/nm.

Here, in the example illustrated in FIG. 10A, when a signal is transferred from the ROADM node 1-1 to the ROADM node 1-4, although the signal is transmitted from the Tx 3 of the ROADM node 1-1 using a signal light having a wavelength λ1 (see the bold solid line in FIG. 10A), since the wavelength λ1 is already used for the communication between the ROADM node 1-2 and the ROADM node 1-3 (see the bold dot line in FIG. 10A), the wavelength of the signal light is converted from λ1 to λ2 by the REG 5 of the ROADM node 1-2, and the signal is transferred to the ROADM node 1-4 using the λ2 signal light (see the bold one-dot-chain line in FIG. 10A).

Thus, in the example of FIG. 10A before a wavelength path is switched, first, in order to compensate for the wavelength dispersion of +2000 ps/nm, of the λ1 signal light compensated in the optical communication line 2-1, the wavelength dispersion compensation amount at the DSP 4 in the Tx 3 is set to 0 ps/nm, and the wavelength dispersion compensation amount at the DSP 8 in the Rx 6 is set to −2000 ps/nm.

Moreover, in order to compensate for the wavelength dispersion of +1500 ps/nm, of the λ2 signal light compensated in the optical communication line 2-2 and the wavelength dispersion of +2000 ps/nm, of the λ2 signal light compensated in the optical communication line 2-3, the wavelength dispersion compensation amount at the DSP 9 in the Tx 7 is set to 0 ps/nm, and the wavelength dispersion compensation amount at the DSP 14 in the Rx 13 is set to −3500 ps/nm.

Further, in order to compensate for the wavelength dispersion of +1500 ps/nm, of the λ1 signal light compensated in the optical communication line 2-2, the wavelength dispersion compensation amount at the DSP 12 in the Rx 11 is set to −1500 ps/nm.

The wavelength dispersion compensation amounts at the DSPs 4, 8, 9, 12, and 14 may be set using the NMS, the OSC light, or the like, for example.

Here, it is assumed that the wavelength λ1 used for the communication between the ROADM node 1-2 and the ROADM node 1-3 is deallocated and that the λ1 signal light can be used for the communication between the ROADM node 1-2 and the ROADM node 1-4.

In this case, when the NMS or the like determines that a wavelength path is to be switched as indicated by the bold solid line in FIG. 10B, the wavelength dispersion compensation amount at the DSP 14 in the Rx 13 is not changed, but, for example, the wavelength dispersion compensation amount at the DSP 4 in the Tx 3 is changed from 0 ps/nm to −2000 ps/nm, and the wavelength dispersion compensation amount at the DSP 8 in the Rx 6 is changed from −2000 ps/nm to 0 ps/nm with the aid of the NMS, the OSC light, or the like. When the wavelength dispersion compensation amounts at the DSPs 4 and 8 are changed, it is desirable that the points in time, when the wavelength dispersion compensation amounts at the DSPs 4 and 8 are changed, be controlled so that a total amount of wavelength dispersion of the λ1 signal light compensated in the path indicated by the bold solid line in FIG. 10A does not change but maintains −2000 ps/nm. For example, the points in time, when the wavelength dispersion compensation amounts at the DSPs 4 and 8 are changed, are controlled so as to be the same, or the wavelength dispersion compensation amounts at the DSPs 4 and 8 may be changed gradually so that, even when the points in time are not the same, the service of the communication system is not suspended similarly to the method described in FIG. 5.

According to this example, it is possible to obtain the same advantages as the embodiment described above regardless of the number of ROADM nodes 1.

(4) Second Modification Example

Figure 11:
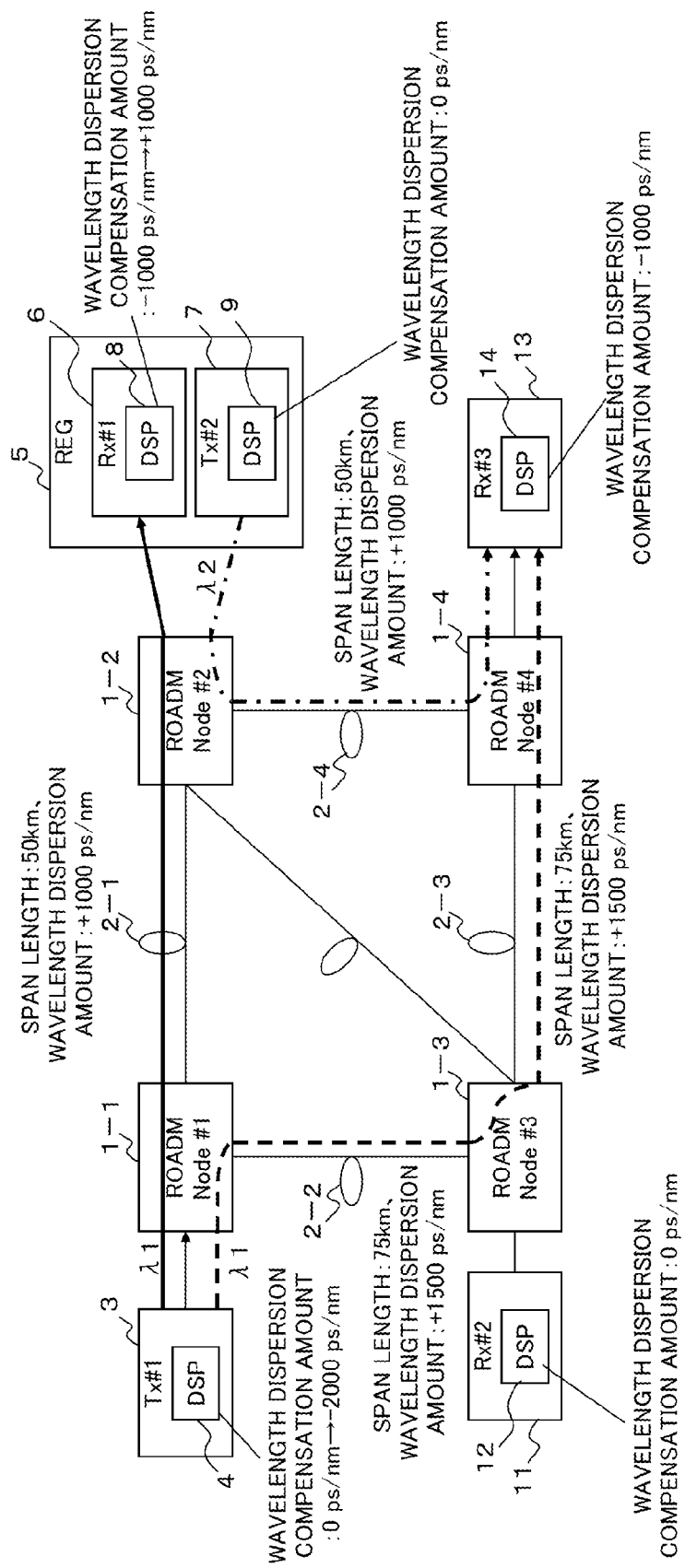
FIG. 11 is a diagram illustrating an example of a wavelength path switching method in an optical communication system according to a second modification example of the present invention.

FIG. 11 is a diagram illustrating an example of a wavelength path switching method according to a second modification example. A bold solid line and a bold one-dot-chain line in FIG. 11 illustrate an example of a wavelength path before the wavelength path is switched, and a bold dot line in FIG. 11 illustrates an example of a wavelength path after the wavelength path is switched.

The optical communication system illustrated in FIG. 11 includes ROADM nodes 1-1 to 1-4 which are examples of an optical communication device capable of realizing adding/dropping and path switching of an optical signal for each wavelength, for example. In FIG. 11, in order to simplify the illustration for description, some components of the ROADM nodes 1-1 to 1-4 are depicted outside the ROADM node similarly to the examples of FIGS. 10A and 10B. Furthermore, the same components in FIG. 11 as those described in FIGS. 10A and 10B have the same functions as those described in FIGS. 10A and 10B, and description thereof will not be provided.

In the example illustrated in FIG. 11, the ROADM node 1-1 and the ROADM node 1-2 are connected by an optical communication line 2-1 having a span length of 50 km and a wavelength dispersion amount of +1000 ps/nm. Moreover, the ROADM node 1-1 and the ROADM node 1-3 are connected by an optical communication line 2-2 having a span length of 75 km and a wavelength dispersion amount of +1500 ps/nm. Further, the ROADM node 1-3 and the ROADM node 1-4 are connected by an optical communication line 2-3 having a span length of 75 km and a wavelength dispersion amount of +1500 ps/nm. In addition, the ROADM node 1-2 and the ROADM node 1-4 are connected by an optical communication line 2-4 having a span length of 50 km and a wavelength dispersion amount of +1000 ps/nm. The ROADM node 1-2 and the ROADM node 1-3 may be connected by an optical communication line or may not be connected.

Here, in the example illustrated in FIG. 11, when a signal is transferred from the ROADM node 1-1 to the ROADM node 1-4, the signal is transferred from the Tx 3 of the ROADM node 1-1 to the Rx 6 in the REG 5 of the ROADM node 1-2 using the wavelength λ1 signal light (see the bold solid line in FIG. 11), the wavelength of the signal light is converted from λ1 to λ2 by the REG 5 of the ROADM node 1-2, and then, the signal is transferred to the ROADM node 1-4 using the λ2 signal light (see the bold one-dot-chain line in FIG. 11).

Thus, when the first optical wavelength path is focused on, first, in order to compensate for the wavelength dispersion of +1000 ps/nm, of the λ1 signal light compensated in the optical communication line 2-1, the wavelength dispersion compensation amount at the DSP 4 in the Tx 3 is set to 0 ps/nm, and the wavelength dispersion compensation amount at the DSP 8 in the Rx 6 is set to −1000 ps/nm.

Moreover, in order to compensate for the wavelength dispersion of +1000 ps/nm, of the λ2 signal light compensated in the optical communication line 2-4, the wavelength dispersion compensation amount at the DSP 9 in the Tx 7 is set to 0 ps/nm, and the wavelength dispersion compensation amount at the DSP 14 in the Rx 13 is set to −1000 ps/nm. Further, the wavelength dispersion compensation amount at the DSP 12 in the Rx 11 is set to 0 ps/nm.

The wavelength dispersion compensation amounts at the DSPs 4, 8, 9, 12, and 14 are set with the aid of the NMS, the OSC light, or the like, for example.

Here, it is assumed that another wavelength path (see the bold dot line in FIG. 11) different from the first optical wavelength path, extending from the ROADM node 1-1 to the ROADM node 1-4 via the ROADM node 1-3 can be used.

In this case, when the NMS or the like determines that a wavelength path is to be switched as indicated by the bold solid line in FIG. 11, and the wavelength path is switched without changing the wavelength dispersion compensation amounts at the DSPs 4, 8, 9, 12, and 14, since the wavelength dispersion compensation amount at the DSP 14 in the Rx 13 of the ROADM node 1-4 is −1000 ps/nm, a wavelength dispersion compensation amount of −2000 ps/nm is lacking for compensating for +3000 ps/nm which is a total amount of a wavelength dispersion in the path after the wavelength path switching.

Thus, in this example, the wavelength dispersion compensation amount at the DSP 14 in the Rx 13 is not changed, but, for example, the wavelength dispersion compensation amount at the DSP 4 in the Tx 3 is changed from 0 ps/nm to −2000 ps/nm and the wavelength dispersion compensation amount at the DSP 8 in the Rx 6 is changed from −1000 ps/nm to +1000 ps/nm with the aid of the NMS, the OSC light, or the like. When the wavelength dispersion compensation amounts at the DSPs 4 and 8 are changed, it is desirable that the points in time, when the wavelength dispersion compensation amounts at the DSPs 4 and 8 are changed, be controlled so that a total amount of a wavelength dispersion of the λ1 signal light compensated in the path indicated by the bold solid line in FIG. 11 does not change but maintains −1000 ps/nm. For example, the points in time, when the wavelength dispersion compensation amounts at the DSPs 4 and 8 are changed, are controlled so as to be the same, or the wavelength dispersion compensation amounts at the DSPs 4 and 8 may be changed gradually so that, even when the points in time are not the same, the service of the communication system is not suspended.

Figure 12:
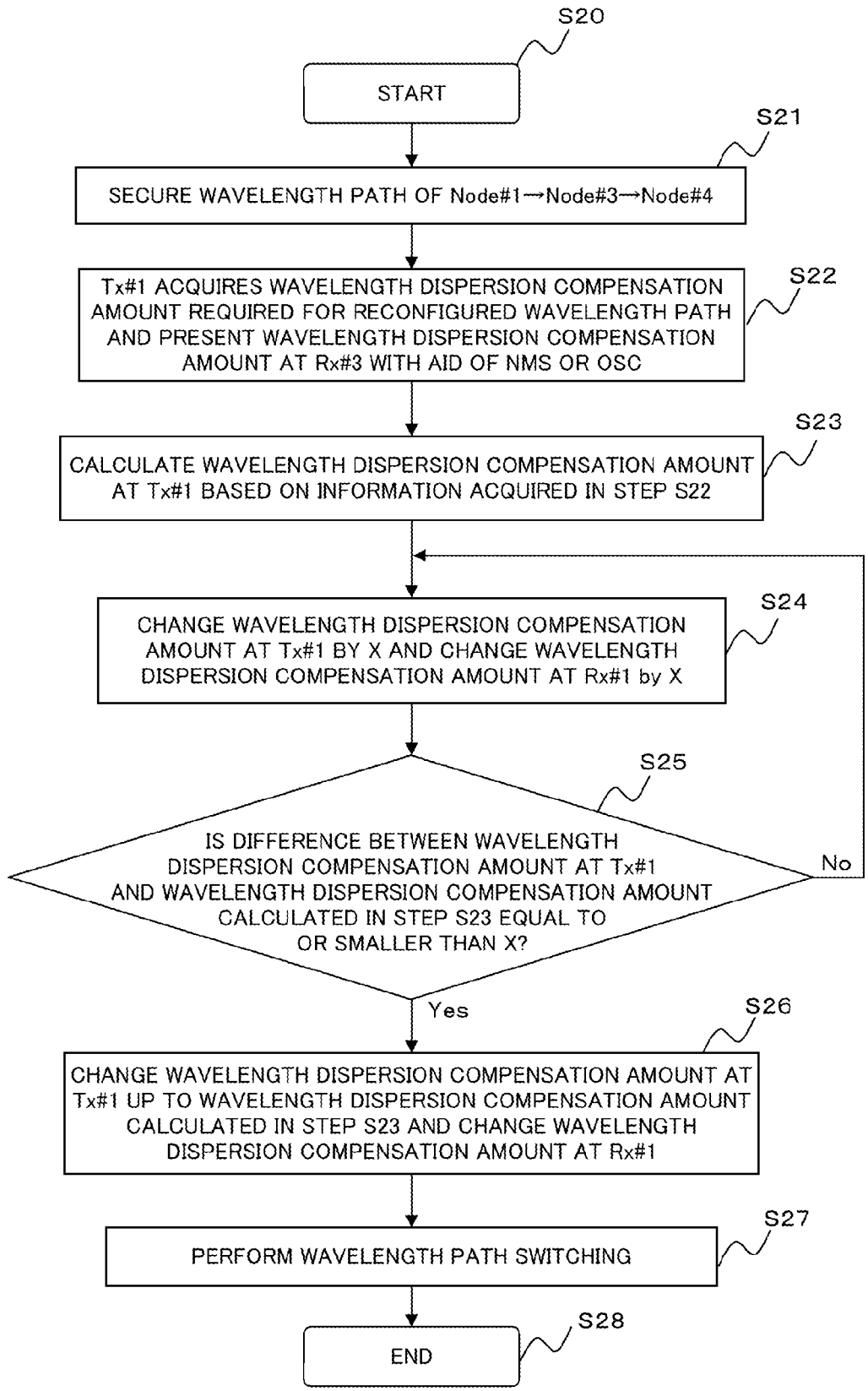
FIG. 12 is a flowchart illustrating an example of the wavelength path switching method in the optical communication system illustrated in FIG. 11.

That is, in this example, as illustrated in FIG. 12, first, when it is determined that a wavelength path is to be switched, the NMS, the OSC light, or the like initiates a procedure for changing a wavelength dispersion compensation amount (Step S20).

When the second optical wavelength path (see the bold dot line in FIG. 11) extending from the ROADM node 1-1 to the ROADM node 1-4 via the ROADM node 1-3 is secured with the aid of the NMS, the OSC light, or the like (Step S21), the Tx 3 acquires a wavelength dispersion compensation amount (for example, −3000 ps/nm) required for the second optical wavelength path and a present wavelength dispersion compensation amount (for example, −1000 ps/nm) at the Rx 13 with the aid of the NMS, the OSC light, or the like (Step S22).

Subsequently, the Tx 3 calculates a wavelength dispersion compensation amount (for example, −2000 ps/nm) required for the Tx 3 after the wavelength path switching based on the respective items of information acquired in Step S22 (Step S23).

Subsequently, the Tx 3 changes the wavelength dispersion compensation amount at the DSP 4 by a certain change amount X (>0) so that the absolute value of the wavelength dispersion compensation amount at the DSP 4 increases, and the Rx 6 changes the wavelength dispersion compensation amount at the DSP 8 by a certain change amount X (>0) so that the absolute value of the wavelength dispersion compensation amount at the DSP 8 decreases (Step S24). The certain change amount X is desirably a very small wavelength dispersion compensation amount (within a dispersion tolerance) that does not affect communication. That is, it is desirable that the service of the communication system continue even when the wavelength dispersion compensation amount is changed by the amount of X. For example, even when the difference between a present actual wavelength dispersion amount and a wavelength dispersion compensation amount is approximately several 100 ps/nm, since the wavelength dispersion can be compensated without any penalty by the digital signal processing of the DSP 8 and the like, a small margin may be added to set X to approximately 100 ps/nm, for example.

Subsequently, the Tx 3 determines whether the difference between the present wavelength dispersion compensation amount at the DSP 4 and the wavelength dispersion compensation amount (for example, −2000 ps/nm) calculated in Step S23 is equal to or smaller than the certain change amount X (Step S25).

When the difference between the present wavelength dispersion compensation amount at the DSP 4 and the wavelength dispersion compensation amount (for example, −2000 ps/nm) calculated in Step S23 is larger than the certain change amount X (No route in Step S25), the Tx 3 and the Rx 6 repeat the processes of steps S24 and S25.

On the other hand, when the difference between the present wavelength dispersion compensation amount at the DSP 4 and the wavelength dispersion compensation amount (for example, −2000 ps/nm) calculated in Step S23 is equal to or smaller than the certain change amount X (Yes route in Step S25), the Tx 3 changes the wavelength dispersion compensation amount at the DSP 4 up to the wavelength dispersion compensation amount (for example, −2000 ps/nm) calculated in Step S23, and the Rx 6 changes the wavelength dispersion compensation amount at the DSP 8 up to +1000 ps/nm (Step S26).

After that, the WSSs are controlled with the aid of the NMS, the OSC light, or the like with the service of the optical communication system continued, whereby switching of a wavelength path is performed (Step S27), and the process ends (Step S28).

According to this example, even when the optical communication system has a mesh network configuration, the same advantages as the embodiment described above can be obtained.

(5) Third Modification Example

FIGS. 13A and 13B are diagrams illustrating an example of a wavelength path switching method according to a third modification example. A bold solid line in FIG. 13A illustrates an example of a wavelength path in a first step before the wavelength path is switched, and a bold solid line and a bold one-dot-chain line in FIG. 13B illustrate an example of a wavelength path in a second step before the wavelength path is switched. Moreover, a bold dot line in FIG. 13B illustrates an example of a wavelength path after the wavelength path is switched.

The optical communication system illustrated in FIGS. 13A and 13B includes ROADM nodes 1-1 to 1-3 which are examples of an optical communication device capable of realizing adding/dropping and path switching of an optical signal for each wavelength, for example. In FIGS. 13A and 13B, in order to simplify the illustration for description, some components of the ROADM nodes 1-1 to 1-3 are depicted outside the ROADM node similarly to the example of FIGS. 8A and 8B. Moreover, the same components in FIGS. 13A and 13B as those described in FIGS. 8A and 8B have the same functions as those described in FIGS. 8A and 8B, and description thereof will not be provided.

In the example illustrated in FIGS. 13A and 13B, the ROADM node 1-1 and the ROADM node 1-2 are connected by an optical communication line 2-1 having a span length of 50 km and a wavelength dispersion amount of +1000 ps/nm. Moreover, the ROADM node 1-1 and the ROADM node 1-3 are connected by an optical communication line 2-2 having a span length of 75 km and a wavelength dispersion amount of +1500 ps/nm. Further, the ROADM node 1-2 and the ROADM node 1-3 are connected by an optical communication line 2-3 having a span length of 50 km and a wavelength dispersion amount of +1000 ps/nm.

Here, in the example illustrated in FIG. 13A, when a signal is transferred from the ROADM node 1-1 to the ROADM node 1-3, the signal is transferred from the Tx 3 of the ROADM node 1-1 to the Rx 11 of the ROADM node 1-3 via the ROADM node 1-2 using the λ1 signal light (see the bold solid line in FIG. 13A). In this case, the λ1 signal light is transferred as light from the ROADM node 1-1 to the ROADM node 1-3 without via the REG 5 in the ROADM node 1-2.

Thus, when the first wavelength path in the first step before switching illustrated in FIG. 13A is focused on, first, in order to compensate for the wavelength dispersion amount of +1000 ps/nm and the wavelength dispersion of +1000 ps/nm, of the λ1 signal light compensated in the optical communication lines 2-1 and 2-3, respectively, the wavelength dispersion compensation amount at the DSP 4 in the Tx 3 is set to 0 ps/nm and the wavelength dispersion compensation amount at the DSP 12 in the Rx 11 is set to −2000 ps/nm.

The wavelength dispersion compensation amounts at the DSPs 4 and 12 are set with the aid of the NMS, the OSC light, or the like, for example.

Here, it is assumed that another wavelength path (see the bold dot line in FIG. 13B) different from the first optical wavelength path, extending from the ROADM node 1-1 to the ROADM node 1-3 via the optical communication line 2-2 can be used.

In this case, when the NMS or the like determines that a wavelength path is to be switched as indicated by the bold solid line in FIG. 13B, and the wavelength path is switched without changing the wavelength dispersion compensation amounts at the DSPs 4 and 12, since the wavelength dispersion compensation amount at the DSP 12 in the Rx 11 of the ROADM node 1-3 is −2000 ps/nm, a wavelength dispersion compensation amount of +500 ps/nm is surplus to compensating for +1500 ps/nm which is a wavelength dispersion amount in the path after the wavelength path switching.

Thus, in this example, when the NMS or the like determines that a wavelength path is to be switched as indicated by the bold solid line in FIG. 13B, first, the wavelength dispersion compensation amounts at the DSP 4 in the Tx 3 and on the DSP 12 in the Rx 11 are not changed, but, for example, the wavelength dispersion compensation amount at the DSP 8 in the Rx 6 is changed to −1000 ps/nm, and the wavelength dispersion compensation amount at the DSP 9 in the Tx 7 is changed to +1000 ps/nm with the aid of the NMS, the OSC light, or the like.

Further, the λ1 signal light transmitted from the Tx 3 is temporarily received by the Rx 6 in the REG 5 of the ROADM node 1-2 as the second step before the wavelength path switching (see the bold solid line in FIG. 13B), and the signal is transferred from the Tx 7 in the REG 5 of the ROADM node 1-2 to the ROADM node 1-3 using a signal light of an optional wavelength (see the bold one-dot-chain line in FIG. 13B).

Moreover, for example, the wavelength dispersion compensation amount at the DSP 9 in the Tx 7 is changed from +1000 ps/nm to +500 ps/nm, and the wavelength dispersion compensation amount at the DSP 12 in the Rx 11 is changed from −2000 ps/nm to −1500 ps/nm with the aid of the NMS, the OSC light, or the like. When the wavelength dispersion compensation amounts at the DSPs 9 and 12 are changed, it is desirable that the points in time, when the wavelength dispersion compensation amounts at the DSPs 9 and 12 are changed, be controlled so that the wavelength dispersion compensation of the signal light compensated in the path indicated by the bold one-dot-chain line in FIG. 13B does not change but maintains −1000 ps/nm. For example, the points in time, when the wavelength dispersion compensation amounts at the DSPs 9 and 12 are changed, are controlled so as to be the same, or the wavelength dispersion compensation amounts at the DSPs 9 and 12 may be changed gradually so that, even when the points in time are not the same, the service of the communication system is not suspended similarly to the examples of FIGS. 5, 9, and 12.

When the changing of the wavelength dispersion compensation amounts at the DSPs 9 and 12 is completed, the WSSs are controlled by the NMS, the OSC light, or the like so that the wavelength path is switched. Moreover, the service in the wavelength path after reconfiguration (switching) is started (see the bold dot line in FIG. 13B).

According to this example, by using the REG 5 that has not been used in the first step before the wavelength path switching in the second step before the wavelength path switching, the same advantages as the embodiment described above can be obtained for the signal light that has been transferred without via the REG 5.

(6) Fourth Modification Example

Figure 14A:
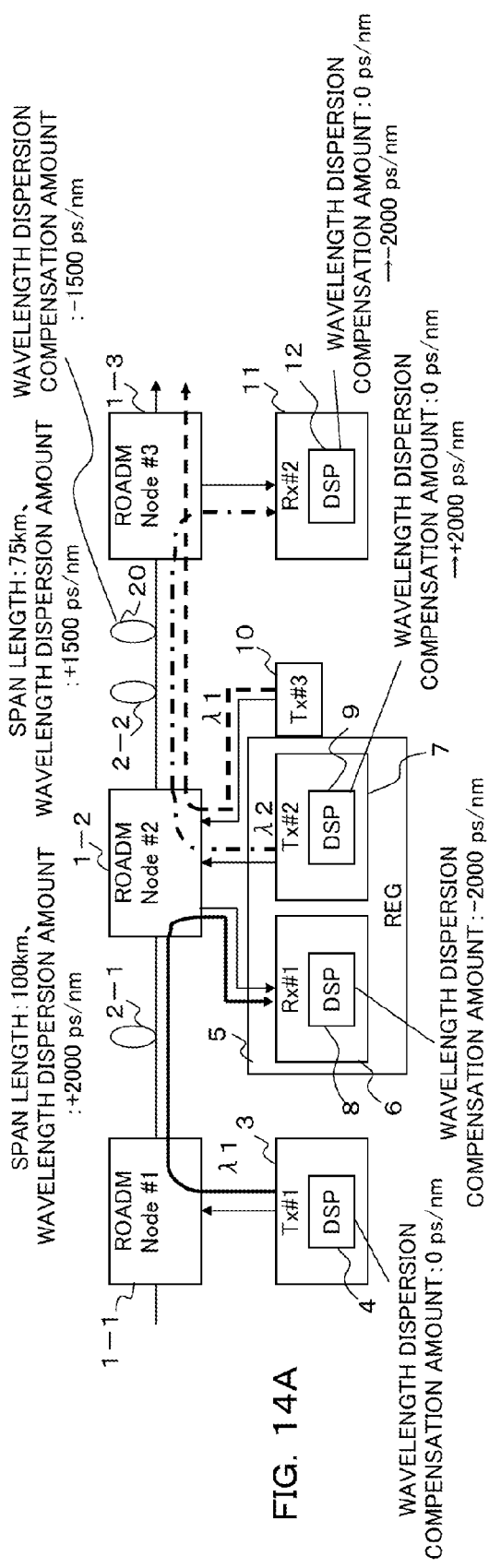
FIGS. 14A and 14B are diagrams illustrating an example of a wavelength path switching method in an optical communication system according to a fourth modification example of the present invention.
Figure 14B:
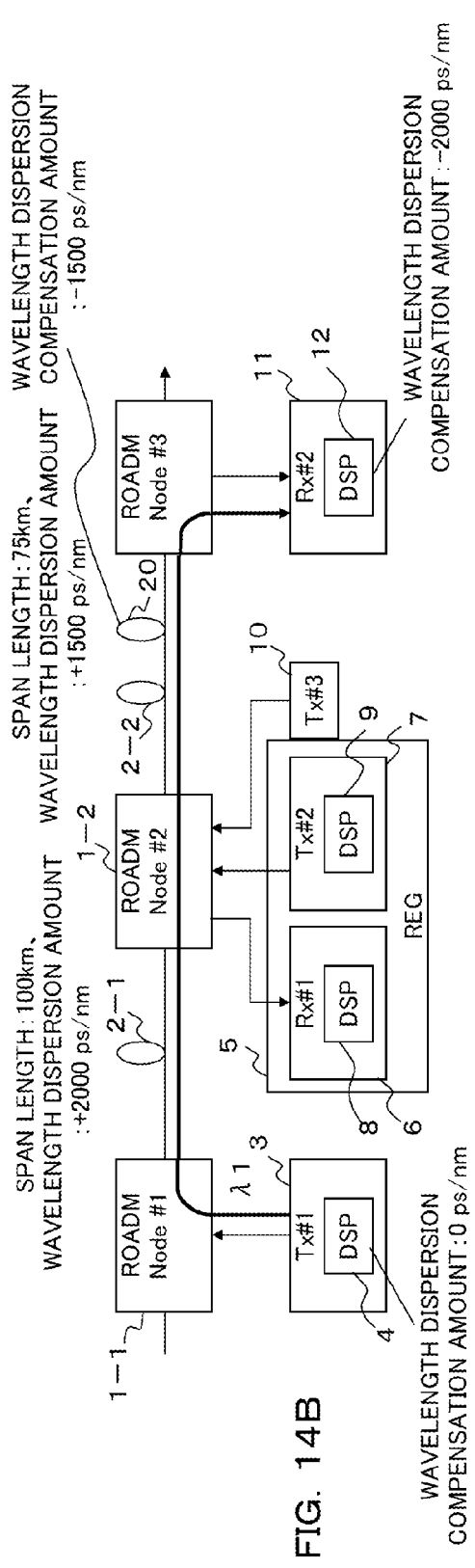

FIGS. 14A and 14B are diagrams illustrating an example of a wavelength path switching method according to a fourth modification example. FIG. 14A illustrates an example of a wavelength path before the wavelength path is switched, and FIG. 14B illustrates an example of a wavelength path after the wavelength path is switched.

The optical communication system illustrated in FIGS. 14A and 14B includes ROADM nodes 1-1 to 1-3 which are examples of an optical communication device capable of realizing adding/dropping and path switching of an optical signal for each wavelength, for example. The number of ROADM nodes 1 is not limited to the number illustrated in FIGS. 14A and 14B. Moreover, in FIGS. 14A and 14B, in order to simplify the illustration for description, some components of the ROADM nodes 1-1 to 1-3 are depicted outside the ROADM node similarly to FIGS. 4A and 4B. Moreover, the same components in FIGS. 14A and 14B as those described in FIGS. 4A and 4B have the same functions as those described in FIGS. 4A and 4B, and description thereof will not be provided.

In the example of FIGS. 14A and 14B, a dispersion compensating fiber (DCF) 20 having a wavelength dispersion compensation amount of −1500 ps/nm, for example, is provided in the optical communication line 2-2 between the ROADM node 1-2 and the ROADM node 1-3.

Thus, in the example of FIG. 14A, the wavelength dispersion occurring in the optical communication line 2-1 is compensated by the DSP 8 in the Rx 6 (Rx#1), and the wavelength dispersion occurring in the optical communication line 2-2 is compensated by the DCF 20.

Here, in the example illustrated in FIG. 14A, when a signal is transferred from the ROADM node 1-1 to the ROADM node 1-3, although the signal is transmitted from the Tx 3 of the ROADM node 1-1 using a wavelength λ1 signal light (see the bold solid line in FIG. 14A), since the wavelength λ1 is already used for the communication between the ROADM node 1-2 and the ROADM node 1-3 (see the bold dot line in FIG. 14A), the wavelength of the signal light is converted from λ1 to λ2 by the REG 5 of the ROADM node 1-2, and the signal is transferred to the ROADM node 1-3 using the λ2 signal light (see the bold one-dot-chain line in FIG. 14A).

Thus, in the example of FIG. 14A before a wavelength path is switched, first, in order to compensate for the wavelength dispersion of +2000 ps/nm, of the λ1 signal light compensated in the optical communication line 2-1, the wavelength dispersion compensation amount at the DSP 4 in the Tx 3 is set to 0 ps/nm, and the wavelength dispersion compensation amount at the DSP 8 in the Rx 6 is set to −2000 ps/nm.

Moreover, since the DCF 20 compensates for the wavelength dispersion of +1500 ps/nm, of the λ2 signal light compensated in the optical communication line 2-2, the wavelength dispersion compensation amounts at the DSP 9 in the Tx 7 and at the DSP 12 in the Rx 11 are set to 0 ps/nm.

The wavelength dispersion compensation amounts at the DSPs 4, 8, 9, and 12 may be set using the NMS, the OSC light, or the like, for example.

Here, it is assumed that the wavelength λ1 used for the communication between the ROADM node 1-2 and the ROADM node 1-3 is deallocated and that the wavelength λ1 signal light can be used for the communication between the ROADM node 1-2 and the ROADM node 1-3.

In this case, when the NMS or the like determines that a wavelength path is to be switched as indicated by the bold solid line in FIG. 14B, the wavelength dispersion compensation amount at the DSP 4 in the Tx 3 is not changed, but, for example, the wavelength dispersion compensation amount at the DSP 12 in the Rx 11 is changed from 0 ps/nm to −2000 ps/nm, and the wavelength dispersion compensation amount at the DSP 9 in the Tx 7 is changed from 0 ps/nm to +2000 ps/nm with the aid of the NMS, the OSC light, or the like. When the wavelength dispersion compensation amounts at the DSPs 4 and 8 are changed, it is desirable that the points in time, when the wavelength dispersion compensation amounts at the DSPs 9 and 12 are changed, be controlled so that a total amount of wavelength dispersion of the λ2 signal light compensated in the path indicated by the bold one-dot-chain line in FIG. 14A does not change but maintains −2000 ps/nm by the DCF 20. For example, the points in time, when the wavelength dispersion compensation amounts at the DSPs 9 and 12 are changed, are controlled so as to be the same, or the wavelength dispersion compensation amounts at the DSPs 9 and 12 may be changed gradually so that, even when the points in time are not the same, the service of the communication system is not suspended similarly to the examples of FIGS. 5, 9, and 12.

According to this example, the same advantages as the embodiment described above can be obtained in the optical communication system in which the wavelength dispersion occurring in some wavelength path is compensated by the DCF 20.

(7) Example of Hardware Configuration

Figure 15:
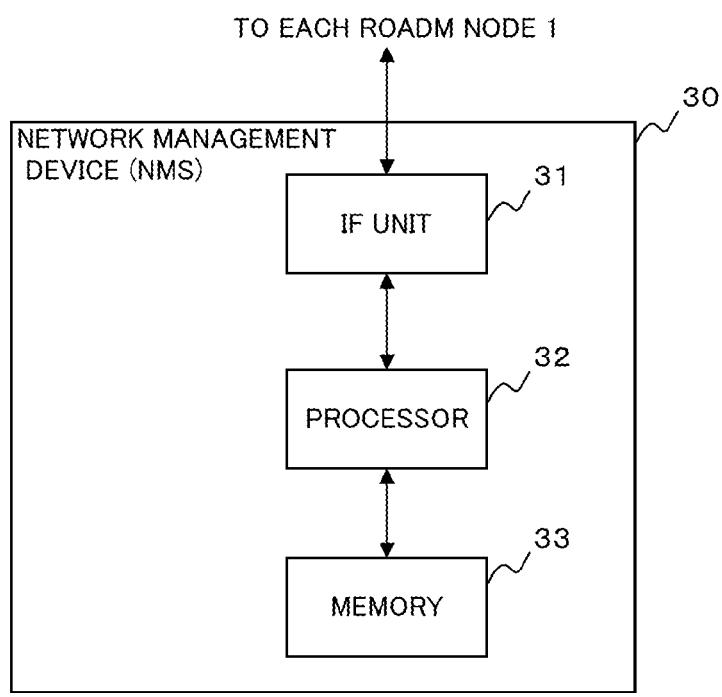
FIG. 15 is a diagram illustrating an example of a hardware configuration of a network management device (NMS)

Here, FIG. 15 illustrates an example of the hardware configuration of the NMS 30.

An IF unit 31 is an interface device for communicating with the ROADM nodes 1 and the SVCs 40-1 to 40-3 provided in the optical communication system, and includes an optical receiver, an optical transmitter, and the like, for example.

Moreover, a processor 32 is a device that processes data (signals), and includes a central processing unit (CPU), a digital signal processor (DSP), and the like, for example.

Further, a memory 33 is a device that stores data, and includes a read only memory (ROM), a random access memory (RAM), and the like, for example. For example, the memory 33 stores a table that stores a span length, a wavelength dispersion amount, and the like, a table that stores the wavelength dispersion compensation amounts at the DSPs 4, 8, 9, 12, and 14, a table that stores the certain change amount X, and the like as the information on the optical communication lines 2-1 to 2-4 included in the optical communication system.

When the NMS 30 manages and executes the wavelength path switching method according to the embodiment and the modification examples described above, the processor 32 and the memory 33 function as examples of a processing unit that determines the setting of the optical communication system. That is, the processor 32 and the memory 33 function as examples of a control device that issues instructions for the wavelength dispersion compensation amount changing operation and the switching operation.

Moreover, when the NMS 30 manages and executes the wavelength path switching method according to the embodiment and the modification examples described above, the IF unit 31 functions as an example of a notifying unit that notifies at least one of the ROADM nodes 1 of the determination by the processing unit. The SVCs 40-1 to 40-3 have substantially the same configuration as the hardware configuration of the NMS illustrated in FIG. 15.

Figure 16:
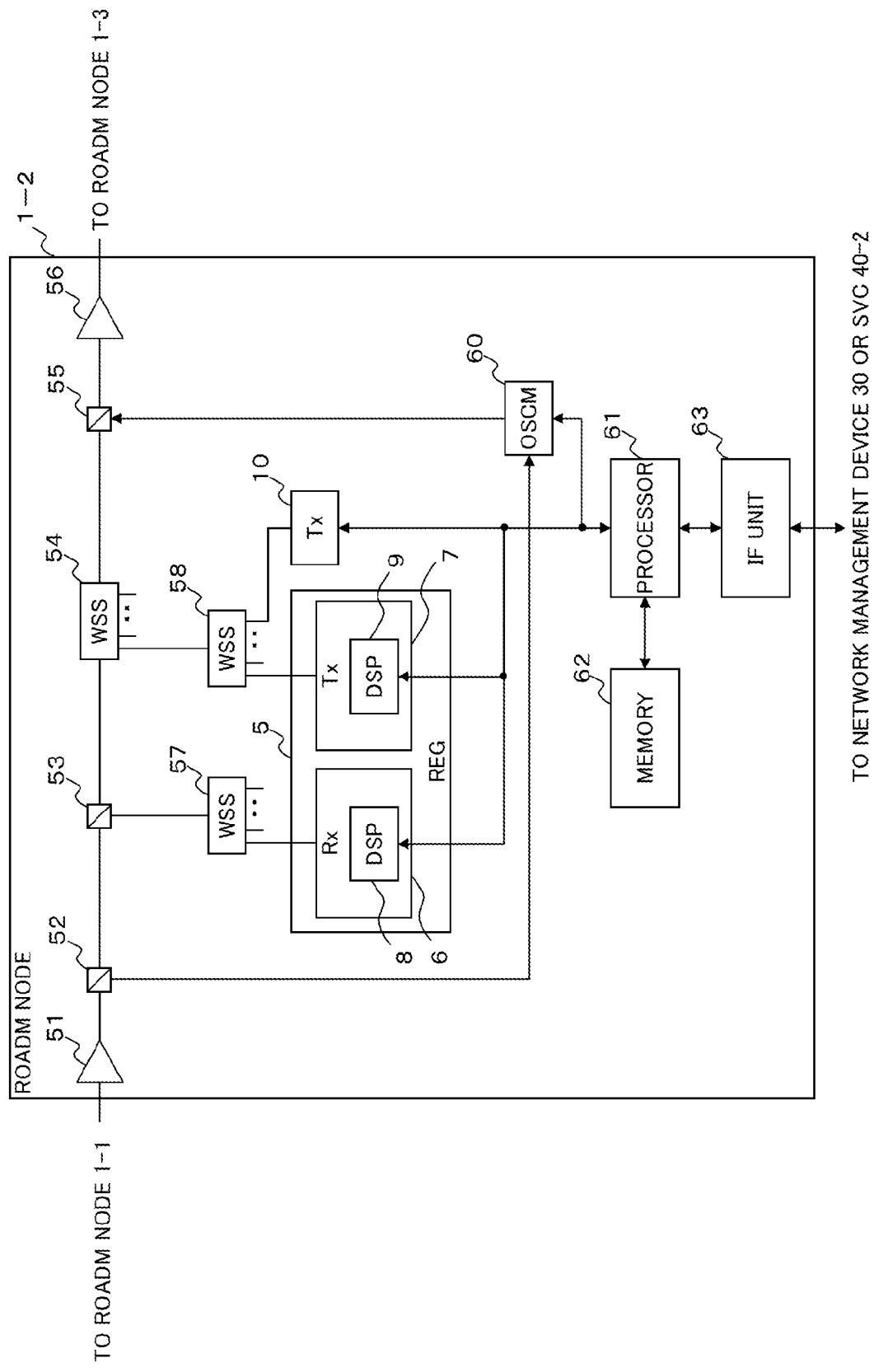
FIG. 16 is a diagram illustrating an example of a hardware configuration of a reconfigurable OADM (ROADM) node.

Moreover, FIG. 16 illustrates an example of the hardware configuration of the ROADM node 1-2.

A wavelength-multiplexed signal light input from the ROADM node 1-1 to the ROADM node 1-2 via an optical communication line is amplified by an optical amplifier 51 and is split by an optical coupler 52 and supplied to a path to an optical coupler 53 and a path to an OSC module (OSCM) 60.

Moreover, the optical coupler 53 splits and supplies the wavelength-multiplexed signal light split by the optical coupler 52 to a path to a WSS 54 and a path to a WSS 57.

The WSS 57 selects a signal light of an optional wavelength included in the wavelength-multiplexed signal light split by the optical coupler 53 and outputs the signal light to an Rx 6 in an REG 5.

Moreover, a Tx 7 transmits the signal light received by the Rx 6 by converting a wavelength. The signal light transmitted from the Tx 7 is combined with the wavelength-multiplexed signal light after passing through the WSSs 58 and 54.

Further, a Tx 10 transmits a signal by superimposing the signal on a light having any one of wavelengths. The signal light transmitted from the Tx 10 is also combined with the wavelength-multiplexed signal light after passing through the WSSs 58 and 54.

An optical coupler 55 combines an OSC light or an SV light from the OSCM 60 with the wavelength-multiplexed signal light.

The wavelength-multiplexed signal light in which the light from the Tx 7, the Tx 10 and the OSCM 60 are combined is amplified by an optical amplifier 56 and is transferred to the ROADM node 1-3 via an optical communication line.

The OSCM 60 is a device that processes the OSC light or the SV signal transmitted from the NMS 30 or the SVCs 40-1 to 40-3.

Moreover, a processor 61 is a device that processes data (signals), and includes a CPU, a DSP, and the like, for example.

Further, a memory 62 is a device that stores data, and includes a ROM, a RAM, and the like, for example. For example, the memory 62 stores a table that stores a span length, a wavelength dispersion amount, and the like, a table that stores wavelength dispersion compensation amounts at the DSPs 4, 8, 9, 12, and 14, a table that stores the certain change amount X, and the like as the information on the optical communication lines 2-1 to 2-4 included in the optical communication system.

Moreover, an IF unit 63 is an interface device for communicating with the NMS 30, the SVC 40-2, or the like included in the optical communication system, and includes an optical receiver, an optical transmitter, and the like, for example.

When the ROADM nodes 1 manage and execute the wavelength path switching method according to the embodiment and the modification examples described above, the processor 61 and the memory 62 function as examples of a control device that issues instructions on the operation for changing and switching a wavelength dispersion compensation amount. The other ROADM nodes 1-1, 1-3, and 1-4 have substantially the same configuration as the hardware configuration of the ROADM node 1-2 illustrated in FIG. 16.

(8) Others

The configurations and functions of the ROADM nodes 1, the NMS 30, and the SVCs 40-1 to 40-3 in the embodiment and the modification examples described above may be appropriately selected as necessary and may be appropriately used in combination. That is, the respective configurations and functions may be appropriately selected and may be appropriately used in combination so that the functions of the present invention can be realized.

When a wavelength path is switched, it is possible to shorten the service suspension period.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength path switching method in an optical communication system including a plurality of optical communication devices that transfer a signal light and an optical repeater that relays the signal light, the method for switching a first wavelength path to a second wavelength path between a first optical communication device and a second optical communication device, the first wavelength path and the second wavelength path being among a plurality of wavelength paths, the first optical communication device and the second optical communication device being among the plurality of optical communication devices, the method comprising:
    compensating, by at least one of the first optical communication device, the second optical communication device, and the optical repeater that relays in the first wavelength path, for wavelength dispersion in the first wavelength path;
    changing, by the first optical communication device or the second optical communication device, a wavelength dispersion compensation amount at the first optical communication device or the second optical communication device so that a wavelength dispersion in the second wavelength path is compensated;
    changing, by the optical repeater, a wavelength dispersion compensation amount at the optical repeater so that a total amount of a wavelength dispersion of the signal light compensated in the first wavelength path does not change with the change in the wavelength dispersion compensation amount at the first optical communication device or the second optical communication device; and
    switching the first wavelength path to the second wavelength path after the wavelength dispersion compensation amount at the first optical communication device or the second optical communication device is changed to a value that can compensate for the wavelength dispersion in the second wavelength path.

2. The wavelength path switching method according to claim 1, wherein
    the switching is performed while maintaining communication between the first optical communication device and the second optical communication device.

3. The wavelength path switching method according to claim 1, wherein
    an amount of change in the wavelength dispersion compensation amount at the first optical communication device or the second optical communication device and an amount of change in the wavelength dispersion compensation amount at the optical repeater are set to be equal to or smaller than a certain dispersion tolerance.

4. The wavelength path switching method according to claim 1, wherein
    the changing of the wavelength dispersion compensation amount at the first optical communication device or the second optical communication device and the changing of the wavelength dispersion compensation amount at the optical repeater are performed at the same point in time.

5. The wavelength path switching method according to claim 1, wherein
    the changing of the wavelength dispersion compensation amount at the first optical communication device or the second optical communication device, the changing of the wavelength dispersion compensation amount at the optical repeater, and the switching of the wavelength path are controlled according to, for managing the optical communication system, at least one of a network management device, an optical supervisory channel (OSC) light, and a supervisory (SV) signal.

6. An optical communication system comprising:
    a plurality of optical communication devices that transfer a signal light; and
    an optical repeater that relays the signal light, wherein
    at least one of a first optical communication device among the plurality of optical communication devices, a second optical communication device among the plurality of optical communication devices, and the optical repeater that relays a first wavelength path compensates for wavelength dispersion in the first wavelength path,
    the first optical communication device or the second optical communication device changes a wavelength dispersion compensation amount at the first optical communication device or the second optical communication device so that the wavelength dispersion in a second wavelength path is compensated, and the optical repeater changes a wavelength dispersion compensation amount at the optical repeater so that a total amount of wavelength dispersion of the signal light compensated in the first wavelength path does not change with the change in the wavelength dispersion compensation amount at the first optical communication device or the second optical communication device, and
    the first wavelength path is switched to the second wavelength path after the wavelength dispersion compensation amount at the first optical communication device or the second optical communication device is changed to a value that can compensate for the wavelength dispersion in the second wavelength path.

7. The optical communication system according to claim 6, wherein
    the switching is performed while maintaining communication between the first optical communication device and the second optical communication device.

8. The optical communication system according to claim 6, wherein
    an amount of change in the wavelength dispersion compensation amount at the first optical communication device or the second optical communication device and an amount of change in the wavelength dispersion compensation amount at the optical repeater are set to be equal to or smaller than a certain dispersion tolerance.

9. The optical communication system according to claim 6, wherein
    the changing of the wavelength dispersion compensation amount at the first optical communication device or the second optical communication device and the changing of the wavelength dispersion compensation amount at the optical repeater are performed at the same point in time.

10. The optical communication system according to claim 6, wherein
the changing of the wavelength dispersion compensation amount at the first optical communication device or the second optical communication device, the changing of the wavelength dispersion compensation amount at the optical repeater, and the switching of the wavelength path are controlled according to, for managing the optical communication system, at least one of a network management device, an optical supervisory channel (OSC) light, and a supervisory (SV) signal.

11. An optical communication device which is the first optical communication device or the second optical communication device used in the optical communication system according to claim 6, wherein
the wavelength dispersion compensation amount at the first optical communication device or the second optical communication device is changed so that the total amount of the wavelength dispersion of the signal light compensated in the first wavelength path does not change with the change in the wavelength dispersion compensation amount at the optical repeater.

12. An optical repeater which is the optical repeater used in the optical communication system according to claim 6, wherein
the wavelength dispersion compensation amount at the optical repeater is changed so that the total amount of the wavelength dispersion of the signal light compensated in the first wavelength path does not change with the change in the wavelength dispersion compensation amount at the first optical communication device or the second optical communication device.

13. A network management device that manages an optical communication system including a plurality of optical communication devices that transfer a signal light and an optical repeater that relays the signal light, the network management device configured to:
cause at least one of a first optical communication device, a second optical communication device, and the optical repeater that relays a first wavelength path to compensate for wavelength dispersion in the first wavelength path, the first optical communication device and the second optical communication device being among the plurality of optical communication devices;
change a wavelength dispersion compensation amount at the first optical communication device or the second optical communication device so that wavelength dispersion in a second wavelength path is compensated;
change a wavelength dispersion compensation amount at the optical repeater so that a total amount of wavelength dispersion of the signal light compensated in the first wavelength path does not change with the change in the wavelength dispersion compensation amount at the first optical communication device or the second optical communication device; and
switch the first wavelength path to the second wavelength path after the wavelength dispersion compensation amount at the first optical communication device or the second optical communication device is changed to a value that can compensate for the wavelength dispersion in the second wavelength path.

14. The network management device according to claim 13, wherein
the switching is performed while maintaining communication between the first optical communication device and the second optical communication device.

15. The network management device according to claim 13, wherein
an amount of change in the wavelength dispersion compensation amount at the first optical communication device or the second optical communication device and an amount of change in the wavelength dispersion compensation amount at the optical repeater are set to be equal to or smaller than a certain dispersion tolerance.

16. The network management device according to claim 13, wherein
the changing of the wavelength dispersion compensation amount at the first optical communication device or the second optical communication device and the changing of the wavelength dispersion compensation amount at the optical repeater are performed at the same point in time.

17. The network management device according to claim 13, wherein
the changing of the wavelength dispersion compensation amount at the first optical communication device or the second optical communication device, the changing of the wavelength dispersion compensation amount at the optical repeater, and the switching of the wavelength path are controlled according to, for managing the optical communication system, at least one of a network management device, an optical supervisory channel (OSC) light, and a supervisory (SV) signal.

* * * * *